United States Patent
Dubelman et al.

(10) Patent No.: US 12,521,942 B2
(45) Date of Patent: Jan. 13, 2026

(54) RECLAMATION SYSTEM FOR ADDITIVE MANUFACTURING

(71) Applicant: General Electric Company, Schenectady, NY (US)

(72) Inventors: Meredith Elissa Dubelman, Liberty Township, OH (US); Christopher David Barnhill, Cincinnati, OH (US); Xi Yang, Mason, OH (US); William Joseph Steele, Lawrenceburg, IN (US); Brian Thomas Thompson, Loveland, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/635,285

(22) Filed: Apr. 15, 2024

(65) Prior Publication Data

US 2024/0269931 A1    Aug. 15, 2024

Related U.S. Application Data

(63) Continuation of application No. 17/837,302, filed on Jun. 10, 2022, now Pat. No. 11,958,250.
(Continued)

(51) Int. Cl.
*B29C 64/357* (2017.01)
*B29C 64/124* (2017.01)
(Continued)

(52) U.S. Cl.
CPC .......... *B29C 64/357* (2017.08); *B29C 64/124* (2017.08); *B29C 64/245* (2017.08);
(Continued)

(58) Field of Classification Search
CPC ... B29C 64/124; B29C 64/129; B29C 64/135; B29C 64/245; B29C 64/357;
(Continued)

(56) References Cited

U.S. PATENT DOCUMENTS

| | | |
|---|---|---|
| 1,990,749 A | 2/1935 | Phillips et al. |
| 2,259,517 A | 10/1941 | Drenkard, Jr. |

(Continued)

FOREIGN PATENT DOCUMENTS

| | | |
|---|---|---|
| CN | 101628477 A | 1/2010 |
| CN | 103210344 A | 7/2013 |

(Continued)

OTHER PUBLICATIONS

Admatec, Admaflex 300 DLP 3D Printer, Specifications, Features, Design and Functions, Netherlands, 2 Pages. Retrieved Nov. 5, 2020 from Webpage: https://admateceurope.com/files/10f1a369c2239943e6506f27ba920bd4dd9359078e744369695ab6ffbde75c6c?filename=Admaflex%20300%20brochure.pdf&sig=hOvDlzxkSmFOZwjM.
(Continued)

*Primary Examiner* — JaMel M Nelson
(74) *Attorney, Agent, or Firm* — Dinsmore & Shohl LLP

(57) ABSTRACT

An additive manufacturing apparatus can include a stage configured to hold one or more cured layers of resin that form a component. A radiant energy device can be operable to generate and project radiant energy in a patterned image. An actuator can be configured to change a relative position of the stage relative to the radiant energy device. A reclamation system can be downstream of the stage and can be configured to remove at least a portion of the resin from a resin support. The reclamation system can include a first collection structure configured to accept a resin support along a resin support movement direction. A first scraper is positioned within the first collection structure. The first
(Continued)

scraper has an elongation axis that is offset from the resin support movement direction by an offset angle that is less than 90 degrees.

20 Claims, 13 Drawing Sheets

Related U.S. Application Data

(60) Provisional application No. 63/214,309, filed on Jun. 24, 2021.

(51) Int. Cl.
*B29C 64/245* (2017.01)
*B33Y 10/00* (2015.01)
*B33Y 30/00* (2015.01)
*B33Y 40/00* (2020.01)

(52) U.S. Cl.
CPC .............. *B33Y 10/00* (2014.12); *B33Y 30/00* (2014.12); *B33Y 40/00* (2014.12)

(58) Field of Classification Search
CPC ......... B33Y 10/00; B33Y 30/00; B33Y 40/00; B33Y 50/00; B33Y 50/20
See application file for complete search history.

(56) References Cited

U.S. PATENT DOCUMENTS

| | | |
|---|---|---|
| 3,264,103 A | 8/1966 | Cohen et al. |
| 3,395,014 A | 7/1968 | Cohen et al. |
| 3,486,482 A | 12/1969 | Hunger |
| 3,710,846 A | 1/1973 | Properzi |
| 3,875,067 A | 4/1975 | DeSorgo et al. |
| 3,991,149 A | 11/1976 | Hurwitt |
| 4,041,476 A | 8/1977 | Swainson |
| 4,292,827 A | 10/1981 | Waugh |
| 4,575,330 A | 3/1986 | Hull |
| 4,752,498 A | 6/1988 | Fudim |
| 4,945,032 A | 7/1990 | Murphy et al. |
| 5,015,312 A | 5/1991 | Kinzie |
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,088,047 A | 2/1992 | Bynum |
| 5,094,935 A | 3/1992 | Vassiliou et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,162,167 A | 11/1992 | Minh et al. |
| 5,174,931 A | 12/1992 | Almquist et al. |
| 5,175,077 A | 12/1992 | Grossa |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,326 A | 8/1993 | Grossa |
| 5,236,637 A | 8/1993 | Hull |
| 5,236,812 A | 8/1993 | Vassiliou et al. |
| 5,247,180 A | 9/1993 | Mitcham et al. |
| 5,248,456 A | 9/1993 | Evans, Jr. et al. |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,460,758 A | 10/1995 | Langer et al. |
| 5,496,682 A | 3/1996 | Quadir et al. |
| 5,610,824 A | 3/1997 | Vinson et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,688,464 A | 11/1997 | Jacobs et al. |
| 5,693,144 A | 12/1997 | Jacobs et al. |
| 5,697,043 A | 12/1997 | Baskaran et al. |
| 5,717,599 A | 2/1998 | Menhennett et al. |
| 5,718,279 A | 2/1998 | Saoth et al. |
| 5,746,833 A | 5/1998 | Gerhardt |
| 5,764,521 A | 6/1998 | Batchelder et al. |
| 5,807,437 A | 9/1998 | Sachs et al. |
| 5,824,184 A | 10/1998 | Kamijo et al. |
| 5,851,465 A | 12/1998 | Bredt |
| 5,866,058 A | 2/1999 | Batchelder et al. |
| 5,895,547 A | 4/1999 | Kathrein et al. |
| 5,900,207 A | 5/1999 | Danforth et al. |
| 5,939,008 A | 8/1999 | Comb et al. |
| 5,940,674 A | 8/1999 | Sachs et al. |
| 5,945,058 A | 8/1999 | Manners et al. |
| 5,968,561 A | 10/1999 | Batchelder et al. |
| 5,980,813 A | 11/1999 | Narang et al. |
| 5,985,204 A | 11/1999 | Otsuka et al. |
| 6,051,179 A | 4/2000 | Hagenau |
| 6,067,480 A | 5/2000 | Stuffle et al. |
| 6,068,367 A | 5/2000 | Fabbri |
| 6,110,411 A | 8/2000 | Clausen et al. |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,375,451 B1 | 4/2002 | Robinson et al. |
| 6,376,148 B1 | 4/2002 | Liu et al. |
| 6,391,245 B1 | 5/2002 | Smith |
| 6,399,010 B1 | 6/2002 | Guertin et al. |
| 6,401,002 B1 | 6/2002 | Jang et al. |
| 6,403,002 B1 | 6/2002 | van der Geest |
| 6,436,520 B1 | 8/2002 | Yamamoto |
| 6,450,393 B1 | 9/2002 | Doumanidis et al. |
| 6,463,349 B2 | 10/2002 | White et al. |
| 6,471,800 B2 | 10/2002 | Jang et al. |
| 6,500,378 B1 | 12/2002 | Smith |
| 6,512,869 B1 | 1/2003 | Imayama et al. |
| 6,543,506 B1 | 4/2003 | Phillips |
| 6,575,218 B1 | 6/2003 | Burns et al. |
| 6,596,224 B1 | 7/2003 | Sachs et al. |
| 6,641,897 B2 | 11/2003 | Gervasi |
| 6,649,113 B1 | 11/2003 | Manners et al. |
| 6,660,209 B2 | 12/2003 | Leyden et al. |
| 6,668,892 B2 | 12/2003 | Vasilakes et al. |
| 6,682,598 B1 | 1/2004 | Steinmueller et al. |
| 6,780,368 B2 | 8/2004 | Liu et al. |
| 6,786,711 B2 | 9/2004 | Koch et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,914,406 B1 | 7/2005 | Wilkes et al. |
| 6,930,144 B2 | 8/2005 | Oriakhi |
| 6,947,058 B1 | 9/2005 | Elmquist |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,016,738 B1 | 3/2006 | Karunasiri |
| 7,022,207 B2 | 4/2006 | Hirsch |
| 7,045,738 B1 | 5/2006 | Kovacevic et al. |
| 7,052,263 B2 | 5/2006 | John |
| 7,070,250 B2 | 7/2006 | Lester et al. |
| 7,074,029 B2 | 7/2006 | Stockwell et al. |
| 7,084,875 B2 | 8/2006 | Plante |
| 7,087,109 B2 | 8/2006 | Bredr et al. |
| 7,158,849 B2 | 1/2007 | Huang et al. |
| 7,164,420 B2 | 1/2007 | Ard |
| 7,195,472 B2 | 3/2007 | John |

(56) References Cited

U.S. PATENT DOCUMENTS

| | | |
|---|---|---|
| 7,261,542 B2 | 8/2007 | Hickerson et al. |
| 7,270,528 B2 | 9/2007 | Sherwood |
| 7,300,613 B2 | 11/2007 | Sano et al. |
| 7,351,304 B2 | 4/2008 | Liang et al. |
| 7,402,219 B2 | 7/2008 | Graf |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,555,726 B2 | 6/2009 | Kurtenbach et al. |
| 7,569,174 B2 | 8/2009 | Ruatta et al. |
| 7,572,403 B2 | 8/2009 | Gu et al. |
| 7,575,682 B2 | 8/2009 | Olsta et al. |
| 7,578,958 B2 | 8/2009 | Patel et al. |
| 7,614,866 B2 | 11/2009 | Sperry et al. |
| 7,614,886 B2 | 11/2009 | Sperry et al. |
| 7,636,610 B2 | 12/2009 | Schillen et al. |
| 7,698,947 B2 | 4/2010 | Sarr |
| 7,706,910 B2 | 4/2010 | Hull et al. |
| 7,742,060 B2 | 6/2010 | Maillot |
| 7,758,799 B2 | 7/2010 | Hull et al. |
| 7,767,132 B2 | 8/2010 | Patel et al. |
| 7,771,183 B2 | 8/2010 | Hull et al. |
| 7,780,429 B2 | 8/2010 | Kikuchi |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,845,930 B2 | 12/2010 | Shkolnik et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 7,931,460 B2 | 4/2011 | Scott et al. |
| 7,962,238 B2 | 6/2011 | Shkolnik et al. |
| 7,964,047 B2 | 6/2011 | Ishida |
| 7,995,073 B1 | 8/2011 | Shemanarev et al. |
| 8,003,040 B2 | 8/2011 | El-Siblani |
| 8,029,642 B2 | 10/2011 | Hagman |
| 8,048,261 B2 | 11/2011 | McCowin |
| 8,070,473 B2 | 12/2011 | Kozlak |
| 8,071,055 B2 | 12/2011 | Davidson et al. |
| 8,096,262 B2 | 1/2012 | Ederer et al. |
| 8,105,066 B2 | 1/2012 | Sperry et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,191,500 B2 | 6/2012 | Dohring et al. |
| 8,211,226 B2 | 7/2012 | Bredt et al. |
| 8,232,444 B2 | 7/2012 | Bar Nathan et al. |
| 8,259,103 B2 | 9/2012 | Glueck et al. |
| 8,269,767 B2 | 9/2012 | Glueck et al. |
| 8,282,866 B2 | 10/2012 | Hiraide |
| 8,326,024 B2 | 12/2012 | Shkolnik |
| 8,372,330 B2 | 2/2013 | El-Siblani et al. |
| 8,394,313 B2 | 3/2013 | El-Siblani et al. |
| 8,413,578 B2 | 4/2013 | Doyle |
| 8,424,580 B2 | 4/2013 | Anderson et al. |
| 8,444,903 B2 | 5/2013 | Lyons et al. |
| 8,454,879 B2 | 6/2013 | Kuzusako et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,513,562 B2 | 8/2013 | Bichsel |
| 8,522,159 B2 | 8/2013 | Kurtenbach et al. |
| 8,540,501 B2 | 9/2013 | Yasukochi |
| 8,568,646 B2 | 10/2013 | Wang et al. |
| 8,568,649 B1 | 10/2013 | Balistreri et al. |
| 8,593,083 B2 | 11/2013 | Firhoj et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,658,076 B2 | 2/2014 | El-Siblani |
| 8,663,568 B2 | 3/2014 | Bar Nathan et al. |
| 8,666,142 B2 | 3/2014 | Shkolnik et al. |
| 8,703,037 B2 | 4/2014 | Hull et al. |
| 8,715,832 B2 | 5/2014 | Ederer et al. |
| 8,718,522 B2 | 5/2014 | Chillscyzn et al. |
| 8,737,862 B2 | 5/2014 | Manico et al. |
| 8,741,194 B1 | 6/2014 | Ederer et al. |
| 8,741,203 B2 | 6/2014 | Liska et al. |
| 8,744,184 B2 | 6/2014 | Ameline et al. |
| 8,761,918 B2 | 6/2014 | Silverbrook |
| 8,801,418 B2 | 8/2014 | El-Siblani et al. |
| 8,805,064 B2 | 8/2014 | Ameline et al. |
| 8,815,143 B2 | 8/2014 | John et al. |
| 8,844,133 B2 | 9/2014 | Fuller |
| 8,845,316 B2 | 9/2014 | Schillen et al. |
| 8,845,953 B1 | 9/2014 | Balistreri et al. |
| 8,862,260 B2 | 10/2014 | Shkolnik et al. |
| 8,872,024 B2 | 10/2014 | Jamar et al. |
| 8,873,024 B2 | 10/2014 | Jamar et al. |
| 8,876,513 B2 | 11/2014 | Lim et al. |
| 8,877,115 B2 | 11/2014 | Elsey |
| 8,888,480 B2 | 11/2014 | Yoo et al. |
| 8,915,728 B2 | 12/2014 | Mironets et al. |
| 8,926,304 B1 | 1/2015 | Chen |
| 8,932,511 B2 | 1/2015 | Napendensky |
| 8,968,625 B2 | 3/2015 | Tan |
| 8,974,717 B2 | 3/2015 | Maguire et al. |
| 8,991,211 B1 | 3/2015 | Arlotti et al. |
| 8,992,816 B2 | 3/2015 | Jonasson et al. |
| 8,998,601 B2 | 4/2015 | Busato |
| 9,011,982 B2 | 4/2015 | Muller et al. |
| 9,031,680 B2 | 5/2015 | Napadensky |
| 9,063,376 B2 | 6/2015 | Mizumura |
| 9,064,922 B2 | 6/2015 | Nakajima et al. |
| 9,067,359 B2 | 6/2015 | Rohner et al. |
| 9,067,360 B2 | 6/2015 | Wehning et al. |
| 9,067,361 B2 | 6/2015 | El-Siblani |
| 9,073,260 B2 | 7/2015 | El-Siblani et al. |
| 9,079,357 B2 | 7/2015 | Ebert et al. |
| 9,101,321 B1 | 8/2015 | Kiesser |
| 9,149,986 B2 | 10/2015 | Huang et al. |
| 9,150,032 B2 | 10/2015 | Roof et al. |
| 9,153,052 B2 | 10/2015 | Ameline et al. |
| 9,159,155 B2 | 10/2015 | Andersen |
| 9,186,847 B2 | 11/2015 | Fruth et al. |
| 9,193,112 B2 | 11/2015 | Ohkusa et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,221,100 B2 | 12/2015 | Schwarze et al. |
| 9,233,504 B2 | 1/2016 | Douglas et al. |
| 9,248,600 B2 | 2/2016 | Goodman et al. |
| 9,259,880 B2 | 2/2016 | Chen |
| 9,308,690 B2 | 4/2016 | Boyer et al. |
| 9,327,385 B2 | 5/2016 | Webb et al. |
| 9,346,217 B2 | 5/2016 | Huang et al. |
| 9,346,218 B2 | 5/2016 | Chen et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,443 B2 | 8/2016 | Ljungblad et al. |
| 9,415,544 B2 | 8/2016 | Kerekes et al. |
| 9,415,547 B2 | 8/2016 | Chen et al. |
| 9,429,104 B2 | 8/2016 | Fuller |
| 9,434,107 B2 | 9/2016 | Zenere |
| 9,446,557 B2 | 9/2016 | Zenere et al. |
| 9,453,142 B2 | 9/2016 | Rolland et al. |
| 9,456,884 B2 | 10/2016 | Uckelmann et al. |
| 9,457,374 B2 | 10/2016 | Hibbs et al. |
| 9,463,488 B2 | 10/2016 | Ederer et al. |
| 9,469,074 B2 | 10/2016 | Ederer et al. |
| 9,486,944 B2 | 11/2016 | El-Siblani et al. |
| 9,486,964 B2 | 11/2016 | Joyce |
| 9,487,443 B2 | 11/2016 | Watanabe |
| 9,498,920 B2 | 11/2016 | DeSimone et al. |
| 9,498,921 B2 | 11/2016 | Teulet |
| 9,511,546 B2 | 12/2016 | Chen et al. |
| 9,517,591 B2 | 12/2016 | Yoo et al. |

(56) References Cited

U.S. PATENT DOCUMENTS

| | | |
|---|---|---|
| 9,517,592 B2 | 12/2016 | Yoo et al. |
| 9,527,244 B2 | 12/2016 | El-Siblani |
| 9,527,272 B2 | 12/2016 | Steele |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,545,784 B2 | 1/2017 | Nakamura |
| 9,550,326 B2 | 1/2017 | Costabeber |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,852 B2 | 2/2017 | Okamoto |
| 9,581,530 B2 | 2/2017 | Guthrie et al. |
| 9,592,635 B2 | 3/2017 | Ebert et al. |
| 9,604,411 B2 | 3/2017 | Rogren |
| 9,610,616 B2 | 4/2017 | Chen et al. |
| 9,616,620 B2 | 4/2017 | Hoechsmann et al. |
| 9,632,037 B2 | 4/2017 | Chen et al. |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,656,344 B2 | 5/2017 | Kironn et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 9,688,027 B2 | 6/2017 | Batchelder et al. |
| 9,707,720 B2 | 7/2017 | Chen et al. |
| 9,720,363 B2 | 8/2017 | Chillscyzn et al. |
| 9,738,034 B2 | 8/2017 | Gruber et al. |
| 9,738,564 B2 | 8/2017 | Capobianco et al. |
| 9,751,292 B2 | 9/2017 | Jamar et al. |
| 9,764,513 B2 | 9/2017 | Stampfl et al. |
| 9,764,535 B2 | 9/2017 | Xie et al. |
| 9,821,546 B2 | 11/2017 | Schaafsma et al. |
| 9,862,146 B2 | 1/2018 | Driessen et al. |
| 9,862,150 B2 | 1/2018 | Chen et al. |
| 9,868,255 B2 | 1/2018 | Comb et al. |
| 9,885,987 B2 | 2/2018 | Chillscysn et al. |
| 9,895,843 B2 | 2/2018 | Lobovsky et al. |
| 9,901,983 B2 | 2/2018 | Hovel et al. |
| 9,908,293 B2 | 3/2018 | Yoo et al. |
| 9,919,474 B2 | 3/2018 | Napadensky |
| 9,919,515 B2 | 3/2018 | Daniell et al. |
| 9,950,368 B2 | 4/2018 | Lampenscherf et al. |
| 9,956,727 B2 | 5/2018 | Steele |
| 9,962,767 B2 | 5/2018 | Buller et al. |
| 9,981,411 B2 | 5/2018 | Green et al. |
| 10,000,023 B2 | 6/2018 | El-Siblani et al. |
| 10,011,076 B2 | 7/2018 | El-Siblani et al. |
| 10,061,302 B2 | 8/2018 | Jacobs et al. |
| 10,071,422 B2 | 9/2018 | Buller et al. |
| 10,124,532 B2 | 11/2018 | El-Siblani et al. |
| 10,150,254 B2 | 12/2018 | Bauman et al. |
| 10,155,345 B2 | 12/2018 | Ermoshkin et al. |
| 10,155,882 B2 | 12/2018 | Rolland et al. |
| 10,183,330 B2 | 1/2019 | Buller et al. |
| 10,183,444 B2 | 1/2019 | Campbell |
| 10,240,066 B2 | 3/2019 | Rolland et al. |
| 10,245,784 B2 | 4/2019 | Teken et al. |
| 10,317,882 B2 | 6/2019 | de Pena et al. |
| 10,336,055 B2 | 7/2019 | Das et al. |
| 10,336,057 B2 | 7/2019 | Moore et al. |
| 10,350,823 B2 | 7/2019 | Rolland et al. |
| 10,357,956 B2 | 7/2019 | Usami et al. |
| 10,406,748 B2 | 9/2019 | Honda |
| 10,612,112 B2 | 4/2020 | Yang et al. |
| 10,639,843 B2 | 5/2020 | Yuan et al. |
| 10,682,808 B2 | 6/2020 | Fujita et al. |
| 10,695,988 B2 | 6/2020 | Hanyu et al. |
| 10,717,212 B2 | 7/2020 | Parkinson et al. |
| 10,737,479 B2 | 8/2020 | El-Siblani et al. |
| 2002/0164069 A1 | 11/2002 | Nagano et al. |
| 2003/0180171 A1 | 9/2003 | Artz et al. |
| 2003/0209836 A1 | 11/2003 | Sherwood |
| 2005/0012239 A1 | 1/2005 | Nakashima |
| 2005/0019016 A1 | 1/2005 | Nakashika et al. |
| 2006/0230984 A1 | 10/2006 | Bredt et al. |
| 2006/0248062 A1 | 11/2006 | Libes et al. |
| 2007/0063366 A1 | 3/2007 | Cunningham et al. |
| 2007/0116937 A1 | 5/2007 | Lazzerini |
| 2008/0170112 A1 | 7/2008 | Hull et al. |
| 2008/0224352 A1 | 9/2008 | Narukawa et al. |
| 2008/0241404 A1 | 10/2008 | Allaman et al. |
| 2010/0003619 A1 | 1/2010 | Das et al. |
| 2010/0196694 A1 | 8/2010 | Yamazaki et al. |
| 2010/0290016 A1 | 11/2010 | Kaehr et al. |
| 2011/0089610 A1 | 4/2011 | El-Siblani et al. |
| 2011/0101570 A1 | 5/2011 | John et al. |
| 2011/0162989 A1 | 7/2011 | Ducker et al. |
| 2011/0207057 A1 | 8/2011 | Hull et al. |
| 2012/0195994 A1 | 8/2012 | El-Siblani et al. |
| 2012/0292800 A1 | 11/2012 | Higuchi et al. |
| 2013/0008879 A1 | 1/2013 | Bichsel |
| 2013/0140741 A1 | 6/2013 | El-Siblani et al. |
| 2014/0099476 A1 | 4/2014 | Subramanian et al. |
| 2014/0103581 A1 | 4/2014 | Das et al. |
| 2014/0200865 A1 | 7/2014 | Lehmann et al. |
| 2014/0239554 A1 | 8/2014 | El-Siblani et al. |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2014/0332507 A1 | 11/2014 | Fockele |
| 2014/0339741 A1 | 11/2014 | Aghababaie et al. |
| 2014/0348691 A1 | 11/2014 | Ljungblad et al. |
| 2014/0348692 A1 | 11/2014 | Bessac et al. |
| 2015/0004042 A1 | 1/2015 | Nimal |
| 2015/0004046 A1 | 1/2015 | Graham et al. |
| 2015/0056365 A1 | 2/2015 | Miyoshi |
| 2015/0086409 A1 | 3/2015 | Hellestam |
| 2015/0102531 A1 | 4/2015 | El-Siblani et al. |
| 2015/0104563 A1 | 4/2015 | Lowe et al. |
| 2015/0140152 A1 | 5/2015 | Chen |
| 2015/0140155 A1 | 5/2015 | Ohno et al. |
| 2015/0145174 A1 | 5/2015 | Comb |
| 2015/0158111 A1 | 6/2015 | Schwarze et al. |
| 2015/0165695 A1 | 6/2015 | Chen et al. |
| 2015/0210013 A1 | 7/2015 | Teulet |
| 2015/0224710 A1 | 8/2015 | El-Siblani |
| 2015/0231828 A1 | 8/2015 | El-Siblani et al. |
| 2015/0231831 A1 | 8/2015 | El-Siblani |
| 2015/0246487 A1 | 9/2015 | El-Siblani |
| 2015/0251351 A1 | 9/2015 | Feygin |
| 2015/0268099 A1 | 9/2015 | Craig et al. |
| 2015/0298396 A1 | 10/2015 | Chen et al. |
| 2015/0301517 A1 | 10/2015 | Chen et al. |
| 2015/0306819 A1 | 10/2015 | Ljungblad |
| 2015/0306825 A1 | 10/2015 | Chen et al. |
| 2015/0321421 A1 | 11/2015 | Ding |
| 2015/0352668 A1 | 12/2015 | Scott et al. |
| 2015/0352791 A1 | 12/2015 | Chen et al. |
| 2015/0355553 A1 | 12/2015 | Allanic |
| 2015/0375452 A1 | 12/2015 | Huang et al. |
| 2016/0016361 A1 | 1/2016 | Lobovsky et al. |
| 2016/0031010 A1 | 2/2016 | O'Neill et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0059484 A1 | 3/2016 | DeSimone et al. |
| 2016/0059485 A1 | 3/2016 | Ding et al. |
| 2016/0067921 A1 | 3/2016 | Willis et al. |
| 2016/0082662 A1 | 3/2016 | Majer |
| 2016/0082671 A1 | 3/2016 | Joyce |
| 2016/0096332 A1 | 4/2016 | Chen et al. |
| 2016/0107340 A1 | 4/2016 | Joyce |
| 2016/0107383 A1 | 4/2016 | Dikovsky et al. |
| 2016/0107387 A1 | 4/2016 | Ooba et al. |
| 2016/0129631 A1 | 5/2016 | Chen et al. |
| 2016/0137839 A1 | 5/2016 | Rolland et al. |
| 2016/0167160 A1 | 6/2016 | Hellestam |

(56) References Cited

U.S. PATENT DOCUMENTS

| | | |
|---|---|---|
| 2016/0176114 A1 | 6/2016 | Tsai et al. |
| 2016/0184931 A1 | 6/2016 | Green |
| 2016/0193785 A1 | 7/2016 | Bell et al. |
| 2016/0214327 A1 | 7/2016 | Ucklemann et al. |
| 2016/0221262 A1 | 8/2016 | Das et al. |
| 2016/0243649 A1 | 8/2016 | Zheng et al. |
| 2016/0303798 A1 | 10/2016 | Mironets et al. |
| 2016/0332386 A1 | 11/2016 | Kuijpers |
| 2016/0361871 A1 | 12/2016 | Jeng et al. |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157841 A1 | 6/2017 | Green |
| 2017/0157862 A1 | 6/2017 | Bauer |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0305136 A1 | 10/2017 | Elsey |
| 2017/0326786 A1 | 11/2017 | Yuan et al. |
| 2017/0326807 A1 | 11/2017 | Greene et al. |
| 2017/0368816 A1 | 12/2017 | Batchelder et al. |
| 2018/0001567 A1 | 1/2018 | Juan et al. |
| 2018/0015672 A1 | 1/2018 | Shusteff et al. |
| 2018/0043619 A1 | 2/2018 | Kim et al. |
| 2018/0056585 A1 | 3/2018 | Du Toit |
| 2018/0056604 A1 | 3/2018 | Sands et al. |
| 2018/0079137 A1 | 3/2018 | Herzog et al. |
| 2018/0085998 A1 | 3/2018 | von Burg |
| 2018/0117790 A1* | 5/2018 | Yun ...................... B29C 64/223 |
| 2018/0169969 A1 | 6/2018 | Deleon et al. |
| 2018/0200948 A1 | 7/2018 | Kuijpers et al. |
| 2018/0201021 A1 | 7/2018 | Beaver et al. |
| 2018/0229332 A1 | 8/2018 | Tsai et al. |
| 2018/0229436 A1 | 8/2018 | Gu et al. |
| 2018/0272603 A1 | 9/2018 | MacCormack et al. |
| 2018/0272608 A1 | 9/2018 | Yun |
| 2018/0345600 A1 | 12/2018 | Holford et al. |
| 2018/0370214 A1 | 12/2018 | Comb et al. |
| 2019/0022937 A1 | 1/2019 | Stelter et al. |
| 2019/0039299 A1 | 2/2019 | Busbee et al. |
| 2019/0047211 A1 | 2/2019 | Herring et al. |
| 2019/0061230 A1 | 2/2019 | Ermoshkin et al. |
| 2019/0112499 A1 | 4/2019 | Rolland et al. |
| 2019/0126548 A1 | 5/2019 | Barnhart et al. |
| 2019/0232550 A1 | 8/2019 | Mark et al. |
| 2019/0240932 A1 | 8/2019 | Graf |
| 2019/0263054 A1 | 8/2019 | Kotler et al. |
| 2019/0283316 A1 | 9/2019 | Rolland et al. |
| 2019/0344381 A1 | 11/2019 | Pomerantz et al. |
| 2019/0389137 A1 | 12/2019 | Frohnmaier et al. |
| 2020/0001398 A1 | 1/2020 | Mellor et al. |
| 2020/0079008 A1* | 3/2020 | Chowdry ............... B33Y 50/02 |
| 2020/0079017 A1 | 3/2020 | MacNeish, III et al. |
| 2020/0108553 A1 | 4/2020 | Rogren |
| 2020/0164437 A1 | 5/2020 | Goth et al. |
| 2020/0198224 A1 | 6/2020 | Dubelman et al. |
| 2020/0230938 A1 | 7/2020 | Menchik et al. |
| 2020/0247040 A1 | 8/2020 | Green |
| 2020/0290275 A1 | 9/2020 | Dubelman et al. |
| 2020/0307075 A1 | 10/2020 | Mattes et al. |
| 2020/0376775 A1 | 12/2020 | Das et al. |
| 2021/0046695 A1 | 2/2021 | Thompson et al. |

FOREIGN PATENT DOCUMENTS

| | | |
|---|---|---|
| CN | 103522546 A | 1/2014 |
| CN | 104175559 A | 12/2014 |
| CN | 104647752 A | 5/2015 |
| CN | 105711101 A | 6/2016 |
| CN | 105773962 A | 7/2016 |
| CN | 107322930 A | 11/2017 |
| CN | 208946717 U | 6/2019 |
| CN | 109968661 A | 7/2019 |
| CN | 111497231 A | 8/2020 |
| DE | 102007010624 A1 | 9/2008 |
| EP | 448459 A1 | 9/1991 |
| EP | 557051 A1 | 8/1993 |
| EP | 1454831 B1 | 9/2004 |
| EP | 1852244 A2 | 11/2007 |
| EP | 1864785 A1 | 12/2007 |
| EP | 1946908 A2 | 7/2008 |
| EP | 2521524 A1 | 11/2012 |
| EP | 3053729 A1 | 8/2016 |
| EP | 3453521 A1 | 3/2019 |
| EP | 3356121 B1 | 10/2020 |
| GB | 2311960 A | 10/1997 |
| JP | H06246839 A | 9/1994 |
| JP | 2002370286 A | 12/2002 |
| JP | 2003039564 A | 2/2003 |
| JP | 2004/257929 A | 9/2004 |
| JP | 2016196098 A | 11/2016 |
| KR | 20170108729 A | 9/2017 |
| KR | 102109664 B1 | 5/2020 |
| WO | WO9600422 A1 | 1/1996 |
| WO | WO9806560 | 2/1998 |
| WO | WO0100390 A1 | 1/2001 |
| WO | WO2006/077665 A1 | 7/2006 |
| WO | WO2006109355 A1 | 10/2006 |
| WO | WO2017009368 A1 | 1/2017 |
| WO | WO2017098968 A1 | 6/2017 |
| WO | WO2017100538 A1 | 6/2017 |
| WO | WO2019/159936 A1 | 8/2019 |
| WO | WO2020033607 A1 | 2/2020 |
| WO | WO2020185553 A1 | 9/2020 |

OTHER PUBLICATIONS

Carbon, Carbon SpeedCell: Additive Manufacturing Reinvented, Redwood City California, Mar. 16, 2017, 4 Pages. Retrieved from Webpage: https://www.carbon3d.com/news/carbon-speedcell-additive-manufacturing-reinvented/.

Carbon, The 3D Printer for Products that Outperform, 8 Pages. Retrieved from Webpage: https://www.carbon3d.com.

DDM Systems, Disruptive Technologies for Additive Manufacturing, 2014. Retrieved on Jul. 7, 2020 from Web Link: http:/www.ddmsys.com/.

Designing Buildings Wiki, Types of Brick Bonding, 6 Pages. Retrieved Mar. 25, 2021 from Webpage: https://www.designingbuildings co.uk/wiki/Types_of_brick_bonding.

(56) References Cited

OTHER PUBLICATIONS

Doctor Blade with Micrometer Screw Gauge, The Tape Casting Warehouse, Inc., Morrisville PA, 6 Pages. Retrieved Mar. 23, 2021 from Webpage: https://www.drblade.com/.
Envisiontec, Advanced DLP for Superior 3D Printing, Mar. 9, 2017, 8 Pages. https://envisiontec.com/wp-content/uploads/2016/12/Why-EnvisionTEC-DLP-3D-Printing-is-Better-rebranded.pdf.
Feng et al., Exposure Reciprocity Law in Photopolymerization of Multi-Functional Acrylates and Methacrylates, Macromolecular Chemistry and Physics, vol. 208, 2007, pp. 295-306.
Formlabs, An Introduction to Post-Curing SLA 3D Prints, 8 Pages. Retrieved from Webpage: https://formlabs.com/blog/introduction-post-curing-sla-3d-prints.
Formlabs, Form Wash & Form Cure, 8 Pages. Retrieved from Webpage: https://formlabs.com/tools/wash-cure/.
Hafkamp et al., A Feasibility Study on Process Monitoring and Control in Vat Photopolymerization of Ceramics, Mechatronics, vol. 56, The Netherlands, Dec. 2018, pp. 220-241. Retrieved from https://doi.org/10.1016/j.mechatronics.2018.02.006.
KUDO3D, Post-Process Your SLA Prints in 4 Easy Steps, 8 Pages. Retrieved from Webpage: https://www.kudo3d.com/post-process-your-sla-prints-in-4-easy-steps/.
Leap, Low-Frequency Sonic Mixing Technology, Energy Efficiency & Renewable Energy, Energy.Gov, 5 Pages. Retrieved Mar. 17, 2021 from Webpage: https://www.energy.gov/eere/amo/low-frequency-sonic-mixing-technology.
Lee et al., Development of a 3D Printer Using Scanning Projection Stereolithography, Scientific Reports, vol. 5, Article No. 9875, 2015, 5 pages. https://www.nature.com/articles/srep09875#s1.
Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.
Limaye, Multi-Objective Process Planning Method for Mask Projection Stereolithography, Dissertation Georgia Institute of Technology, Dec. 2007, 324 Pages.
Lithoz, 2 Pages. Retrieved from Webpage: http://www.lithoz.com/en/our-products/cleaning-station.
Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.
MICRON3D, Cleaning of Printed Models, YouTube, Dec. 5, 2016, 1 Page. Retrieved from Webpage: https://www.youtube.com/watch?v=soAIrSsliBY.
Nussbaum et al., Evaluation of Processing Variables in Large Area Polymer Sintering of Single Layer Components, Solid Freeform Fabrication 2016: Proceedings of the $27^{th}$ Annual International Solid Freeform Fabracation Symposium—An Additive Manufacturing Conference Reviewed Paper, University of South Florida, Tampa Florida.
Omegasonics, Ultrasonic Cleaning of 3D Printer Parts, YouTube, Feb. 26, 2014, 1 Page. Retrieved from Webpage: https://www.youtube.com/watch?v=Gxj47OS5ohk.
Park et al., Development of Multi-Material DLP 3D Printer, Journal of the Korean Society of Manufacturing Technology Engineers, vol. 26, Issue 1, Seoul Korea, Feb. 15, 2017, pp. 100-107. https://doi.org/10.7735/ksmte.2017.26.1.100.
Prodways Tech, Prodways Movinglight Technology Retrieved on Jul. 2, 2020 from Web Link: https://www.prodways.com/en/the-prodways-movinglight-technology/.
Ramco Equipment Corporation, Ramco RamTough-Fully Automated Wash/Rinse/Dry System, YouTube, Jul. 9, 2013, 1 Page. Retrieved from Webpage: https://www.youtube.com/watch?v=i8S5Oc3FVRU.
Ricoh Imaging Company Ltd., The Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imaging.co.jp/english/products/k-1-2/feature/02.html.
Sonics & Materials, Inc., Ultrasonic Food Cutting Equipment, Sonics & Materials, Inc., Retrieved on Jun. 26, 2020, 4 Pages. https://www.sonics.com/food-cutting.
Stemmer Imaging, Ultra-High Resolution for Industrial Imaging, Germany, 9 Pages. Retrieved on Mar. 30, 2021 from Webpage: https://www.stemmer-imaging.com/en/knowledge-base/pixel-shift-technology/.
Stevenson, Admatec's Ceramic 3D Printers, Ceramic, Metal, Fabbaloo 3D Printing News, Jan. 21, 2019, 8 Pages. Retrieved Nov. 24, 2020 from Weblink: https:/www.fabbaloo.com/blog/2019/1/21/admatecs-ceramic-3d-printers.
Techmetals, Electroless Nickel (TM 117C), Engineered Metal Finishing & Performance Coatings, 1 Page. Retrieved from Webpage: https://techmetals.com/pdfs/TM_117C.pdf https://techmetals.com/tm117c-2/.
Telsonic Ultrasonics, Cutting Awning Fabrics and Sealing the Edge, The Powerhouse of Ultrasonics, 2017, 1 Page. https://www.telsonic.com/fileadmin/applications/AS_206_Cut_Seal_Markisengewebe_EN.pdf.
Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.
Tok et al., Tape Casting of High Dielectric Ceramic Substrates for Microelectronics Packaging, Journal of Materials Engineering and Performance, vol. 8, 1999, pp. 469-472. (Abstract Only) https:/link.springer.com/article/10.1361/105994999770346783.
Wikipedia, Pixel Shifting, 2 Pages. Retrieved Mar. 30, 2021 from Webpage: https://en.wikipedia.org/wiki/Pixel_shifting.
Wikipedia, Standing Wave, 11 Pages. Retrieved Mar. 17, 2021 from Webpage: https://en.wikipedia.org/wiki/Standing_wave.

\* cited by examiner

RECLAMATION SYSTEM FOR ADDITIVE MANUFACTURING

CROSS-REFERENCE TO RELATED APPLICATION

The present application claims priority to U.S. patent application Ser. No. 17/837,302, filed on Jun. 10, 2022, which claims priority to U.S. Provisional Patent Application Ser. No. 63/214,309, filed on Jun. 24, 2021, the contents of which are hereby incorporated by reference in their entirety.

FIELD

The present subject matter relates generally to an additive manufacturing apparatus, and more particularly to a reclamation system for the additive manufacturing apparatus.

BACKGROUND

Additive manufacturing is a process in which material is built up layer-by-layer to form a component. Stereolithography (SLA) is a type of additive manufacturing process, which employs a tank of radiant-energy curable photopolymer "resin" and a curing energy source such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin. Exposure to the radiation cures and solidifies the pattern in the resin and joins it to a previously cured layer.

In some instances, additive manufacturing may be accomplished through a "tape casting" process. In this process, a resin is deposited onto a flexible resin support, such as a radiotransparent tape or foil, that is fed out from a supply reel to a build zone. Radiant energy is used to cure the resin to a component that is supported or held by a stage in the build zone. Once the curing of the first layer is complete, the stage and the resin support are separated from one another. The resin support is then advanced and fresh resin is provided to the build zone. In turn, the first layer of the cured resin is placed onto the fresh resin and cured through the energy device to form an additional layer of the component. Subsequent layers are added to each previous layer until the component is completed.

In operation, as each layer of the component is formed, various amounts of resin may be unused and retained on the resin support. Accordingly, it may be beneficial for the additive manufacturing apparatus to include a system that reclaims at least a portion of the unused resin.

BRIEF DESCRIPTION

Aspects and advantages of the present disclosure will be set forth in part in the following description, or may be obvious from the description, or may be learned through practice of the present disclosure.

In some embodiments of the present disclosure, an additive manufacturing apparatus can include a stage configured to hold one or more cured layers of resin that form a component. A radiant energy device can be operable to generate and project radiant energy in a patterned image. An actuator can be configured to change a relative position of the stage relative to the radiant energy device. A reclamation system can be downstream of the stage and can be configured to remove at least a portion of the resin from a resin support. The reclamation system can include a first collection structure configured to accept a resin support therethrough along a resin support movement direction. A first scraper is positioned within the first collection structure. The first scraper has an elongation axis that is offset from the resin support movement direction by an offset angle that is less than 90 degrees.

In some embodiments of the present disclosure, a method of operating a reclamation system for use with an additive manufacturing apparatus is provided. The additive manufacturing apparatus is configured to cure a first portion of a resin to create a layer of a component. The method includes translating a resin support between a first plate and a second plate of a first collection structure at a first resin support translation speed. The method also includes removing a second portion of the resin from the resin support with a first scraper attached to the second plate as the resin support is translated between the first plate and the second plates.

In some embodiments of the present disclosure, a reclamation system for use with an additive manufacturing apparatus that includes a stage configured to support a component and a radiant energy device positioned opposite to the stage such that it is operable to generate and project radiant energy in a patterned image is provided. The reclamation system includes a first plate and a second plate separated from the first plate. A scraper is attached to the second plate. A resin support is configured to be compressed between the scraper and the first plate.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
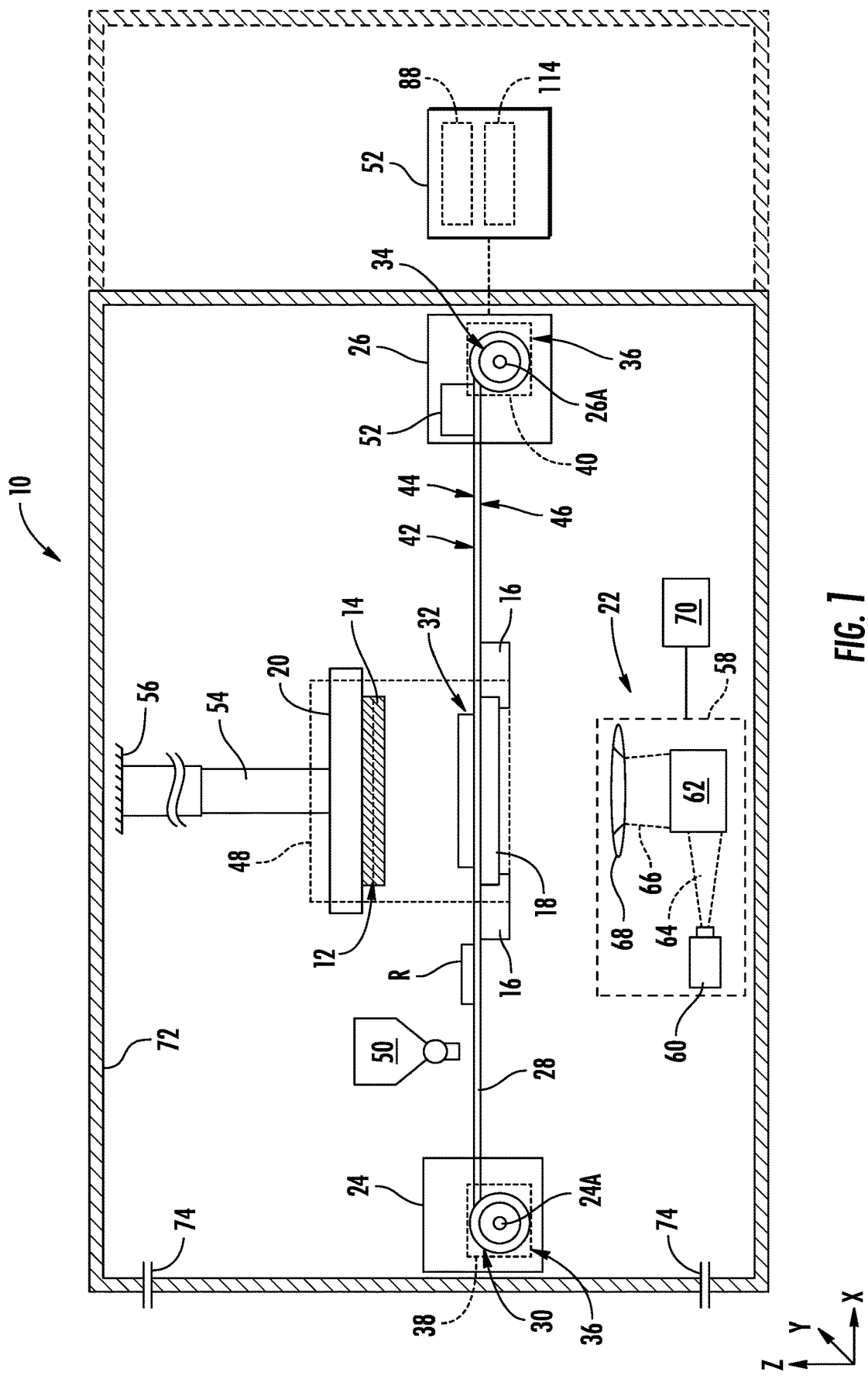
FIG. 1 is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the present disclosure, one or more examples of which are illustrated in the accompanying drawings. The detailed description uses numerical and letter designations to refer to features in the drawings. Like or similar designations in the drawings and description have been used to refer to like or similar parts of the present disclosure.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a flexible resin support, such as a radiotransparent tape or foil, movement along the manufacturing apparatus. For example, "upstream" refers to the direction from which the resin support moves, and "downstream" refers to the direction to which the resin support moves. The term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) (e.g., resins) are provided on each other to "build-up," layer-by-layer, a three-dimensional component. The successive layers generally cure together to form a monolithic component which may have a variety of integral subcomponents. Although additive manufacturing technology is described herein as enabling the fabrication of complex objects by building objects point-by-point, layer-by-layer, variations of the described additive manufacturing apparatus and technology are possible and within the scope of the present subject matter.

The additive manufacturing apparatus can include a support plate, a window supported by the support plate, and a stage moveable relative to the window. The additive manufacturing apparatus further includes a flexible resin support, such as a radiotransparent tape or foil, that supports a resin. The resin support, with the resin thereon, is positioned between the stage and the support plate. A radiant energy device is configured to cure a portion of the resin forming the component, which is translated towards and away from the resin support by stage between successive curing operations.

In operation, as each layer of the component is formed, various amounts of resin may be unused and retained on the resin support after the resin support exits a build zone of the apparatus. In some instances, a reclamation system may be used to reclaim at least a portion of the unused resin. For example, the reclamation system may be used to remove a portion of the resin downstream of the stage.

In various examples, the reclamation system may include a collection structure that includes a scraper that is configured to contact the resin support and direct the resin to a channel. The channel may define a drain that then directs the resin from the channel to a reservoir. In some instances, the scraper may be implemented as a wiper that extends in a non-perpendicular direction relative to a resin support movement direction. The non-perpendicular direction may distribute the amount of force on the resin support to a larger area when the wiper is in contact with the resin support and/or alter an interaction between the resin support and the wiper when compared to embodiments in which the scraper extends in a perpendicular direction relative to a resin support movement direction.

In various examples, the collection structure may be "inline," meaning that the scraper contacts downstream of a material depositor with a common resin support to that which is translated through one or more build zones. Additionally or alternatively, the collection structure may be "remote" meaning that the resin support is wound about a take-up mandrel, removed from the take-up mandrel, and positioned on a first reclamation mandrel. The resin support may then be directed through the collection structure and wrapped about a second reclamation mandrel. In such instances, the resin may contact two opposing sides of the resin support. As such, the scraper may include a first wiper on a first side of the resin support and a second wiper on a second side of the resin support. The collection structure provided herein may be capable of reclaiming at least a portion of the unused resin. By reclaiming the resin, the cost of operation of the apparatus may be reduced.

Referring to the drawings wherein identical reference numerals denote the similar elements throughout the various views, FIG. 1 schematically illustrates an example of one type of suitable apparatus 10 for forming a component 12 created through one or more cured layers 14 of resin. The apparatus 10 can include one or more of a support plate 16, a window 18, a stage 20 that is movable relative to the window 18, and a radiant energy device 22, which, in combination, may be used to form any number (e.g., one or more) of additively manufactured components 12.

In the illustrated example, the apparatus 10 includes a feed module 24, which may include a first mandrel 24A, and a take-up module 26, which may include a second mandrel 26A, that are spaced-apart and configured to couple with respective end portions of a flexible resin support 28, such as a radiotransparent tape, foil, or another type of resin support, extending therebetween. A first portion 30 (e.g., unused) of the resin support 28 may be supported by the first mandrel 24A, an intermediate portion 32 of the resin support 28 can be supported from underneath by the support plate 16, and a second portion 34 of the resin support 28 (e.g., used) may be supported by the second mandrel 26A. Suitable mechanical supports (frames, brackets, etc.) may be provided for the mandrels 24A, 26A and the support plate 16. The first mandrel 24A and/or the second mandrel 26A can be configured to control the resin support translation speed and direction of the resin support 28 such that the desired tension and speed is maintained in the resin support 28 through a drive system 36. By way of example and not limitation, the drive system 36 can be configured as one or more control devices 38, 40 associated with the first mandrel 24A and/or the second mandrel 26A. Moreover, the drive system 36 may include various components, such as motors, actuators, feedback sensors, and/or controls can be provided for driving the mandrels 24A, 26A in such a manner so as to move at least a portion of the resin support 28 between the mandrels 24A.

In various embodiments, the window 18 is transparent and can be operably supported by the support plate 16. Further, the window 18 and the support plate 16 can be integrally formed such that one or more windows 18 are integrated within the support plate 16. Likewise, the resin support 28 is also transparent or includes portions that are transparent. As used herein, the terms "transparent" and "radiotransparent" refer to a material that allows at least a portion of radiant energy of a selected wavelength to pass through. For example, the radiant energy that passes through the window 18 and the resin support 28 can be in the ultraviolet spectrum, the infrared spectrum, the visible spectrum, or any other practicable radiant energy. Non-limiting examples of transparent materials include polymers, glass, and crystalline minerals, such as sapphire or quartz.

The resin support 28 extends between the feed module 24 and the take-up module 26 and defines a "resin surface" 42, which is shown as being planar, but could alternatively be arcuate (depending on the shape of the support plate 16). In some instances, the resin surface 42 may be defined by a first side 44 of the resin support 28 that can be positioned to face the stage 20 with the window 18 on an opposing side of the resin support 28 from the stage 20. A second side 46 of the resin support 28 may be defined as a side that the resin support 28 that is opposite the stage 20. For purposes of convenient description, the resin surface 42 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the resin support 28. As used herein, the Y-axis refers to the transverse direction across the width of the resin support 28 and generally perpendicular to the machine direction. As used herein, the Z-axis refers to the stage 20 direction that can be defined as the direction of movement of the stage 20 relative to the window 18.

The resin surface 42 may be configured to be "non-stick," that is, resistant to adhesion of a cured resin R. The non-stick properties may be embodied by a combination of variables such as the chemistry of the resin support 28, its surface finish, and/or applied coatings. For instance, a permanent or semi-permanent non-stick coating may be applied. One non-limiting example of a suitable coating is polytetrafluoroethylene ("PTFE"). In some examples, all or a portion of the resin surface 42 may incorporate a controlled roughness or surface texture (e.g. protrusions, dimples, grooves, ridges, etc.) with nonstick properties. Additionally or alternatively, the resin support 28 may be made in whole or in part from an oxygen-permeable material.

For reference purposes, an area or volume immediately surrounding the location of the resin support 28 and the window 18 or transparent portion defined by the support plate 16 may be defined as a "build zone," labeled 48.

In some instances, a material depositor 50 may be positioned along the resin support 28. The material depositor 50 may be any device or combination of devices that is operable to apply a layer of the resin R on the resin support 28. The material depositor 50 may optionally include a device or combination of devices to define a height of the resin R on the resin support 28 and/or to level the resin R on the resin support 28. Nonlimiting examples of suitable material deposition devices include chutes, rollers, hoppers, pumps, spray nozzles, spray bars, or printheads (e.g. inkjets). In some examples, a doctor blade may be used to control the thickness of resin R applied to the resin support 28, as the resin support 28 passes the material depositor 50.

In some embodiments, a reclamation system 52 may be configured to remove at least a portion of resin R that remains on the resin support 28 after the resin support 28 is downstream from a build zone 48. As will be described in greater detail below, the reclamation system 52 may include a collection structure 88 and a reservoir 114 for collecting the resin R that is removed from the resin support 28. In various examples, the reclamation system 52 may be inline such that the collection structure 88 contacts a portion of the resin support 28 while another portion of the resin support also is positioned between one or more build zones 48. Additionally or alternatively, the reclamation system 52 may be remote such that the resin support 28 is wound about the take-up mandrel 26A, removed from the take-up mandrel 26A, and positioned within the reclamation system 52 external from the apparatus 10. The resin support 28 may then be directed along the collection structure 88 within the reclamation system 52.

The resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The resin R may be provided in solid (e.g. granular) or liquid form, including a paste or slurry.

Furthermore, the resin R can have a relatively high viscosity fluid that will not "slump" or run off during the build process. The composition of the resin R may be selected as desired to suit a particular application. Mixtures of different compositions may be used. The resin R may be selected to have the ability to out-gas or burn off during further processing, such as a sintering process.

The resin R may incorporate a filler. The filler may be pre-mixed with the resin R, then loaded into the material depositor 50. Alternatively, the filler may be mixed with the resin R on the apparatus 10. The filler includes particles, which are conventionally defined as "a small bit of matter." The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon via application of sufficient energy. For example, fusibility is a characteristic of many available powders including, but not limited to, polymeric, ceramic, glass, and/or metallic materials. The proportion of filler to resin R may be selected to suit a particular application. Generally, any amount of filler may be used so long as the combined material is capable of flowing and being leveled, and there is sufficient resin R to hold together the particles of the filler in the cured state.

With further reference to FIG. 1, the stage 20 is capable of being oriented parallel to the resin surface 42 or the X-Y plane. Various devices may be provided for moving the stage 20 relative to the window 18 parallel to the Z-axis direction. For example, as illustrated in FIG. 1, the movement may be provided through an actuator 54 connected between the stage 20 and a static support 56 and configured to change a relative position of the stage 20 relative to the radiant energy device 22, the support plate 16, the window 18, and/or any other static component of the apparatus 10. The actuator 54 may be configured as a ballscrew electric actuator, linear electric actuator, pneumatic cylinder, hydraulic cylinder, delta drive, or any other practicable device may additionally or alternatively be used for this purpose. In addition to, or as an alternative to, making the stage 20 movable, the resin support 28 could be movable parallel to the Z-axis direction.

The radiant energy device 22 may be configured as any device or combination of devices operable to generate and project radiant energy on the resin R in a suitable pattern and with a suitable energy level and other operating characteristics to cure the resin R during the build process. For example, as shown in FIG. 1, the radiant energy device 22 may include a projector 58, which may generally refer to any device operable to generate a radiant energy patterned image of suitable energy level and other operating characteristics to cure the resin R. As used herein, the term "patterned image" refers to a projection of radiant energy comprising an array of one or more individual pixels. Non-limiting examples of patterned imaged devices include a DLP projector or another digital micromirror device, a two-dimensional array of LEDs, a two-dimensional array of lasers, and/or optically addressed light valves. In the illustrated example, the projector 58 includes a radiant energy source 60 such as a UV lamp, an image forming apparatus 62 operable to receive a source beam 64 from the radiant energy source 60 and generate a patterned image 66 to be projected onto the surface of the resin R, and optionally focusing optics 68, such as one or more lenses.

The image forming apparatus 62 may include one or more mirrors, prisms, and/or lenses and is provided with suitable actuators, and arranged so that the source beam 64 from the radiant energy source 60 can be transformed into a pixelated image in an X-Y plane coincident with the surface of the resin R. In the illustrated example, the image forming apparatus 62 may be a digital micro-mirror device.

The projector 58 may incorporate additional components, such as actuators, mirrors, etc. configured to selectively move the image forming apparatus 62 or another part of the projector 58 with the effect of rastering or shifting the location of the patterned image on the resin surface 42. Stated another way, the patterned image may be moved away from a nominal or starting location.

In addition to other types of radiant energy devices 22, the radiant energy device 22 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 60 and a beam steering apparatus. The radiant energy source 60 may include any device operable to generate a beam of suitable power and other operating characteristics to cure the resin R. Non-limiting examples of suitable radiant energy sources include lasers or electron beam guns.

The apparatus 10 may be operably coupled with a computing system 70. The computing system 70 in FIG. 1 is a generalized representation of the hardware and software that may be implemented to control the operation of the apparatus 10, including some or all of the stage 20, the radiant energy device 22, the actuator 54, and the various parts of the apparatus 10 described herein. The computing system 70 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control.

Optionally, the components of the apparatus 10 may be surrounded by a housing 72, which may be used to provide a shielding or inert gas (e.g., a "process gas") atmosphere using gas ports 74. Optionally, pressure within the housing 72 could be maintained at a desired level greater than or less than atmospheric. Optionally, the housing 72 could be temperature and/or humidity controlled. Optionally, ventilation of the housing 72 could be controlled based on factors such as a time interval, temperature, humidity, and/or chemical species concentration. In some embodiments, the housing 72 can be maintained at a pressure that is different than an atmospheric pressure.

Figure 2:
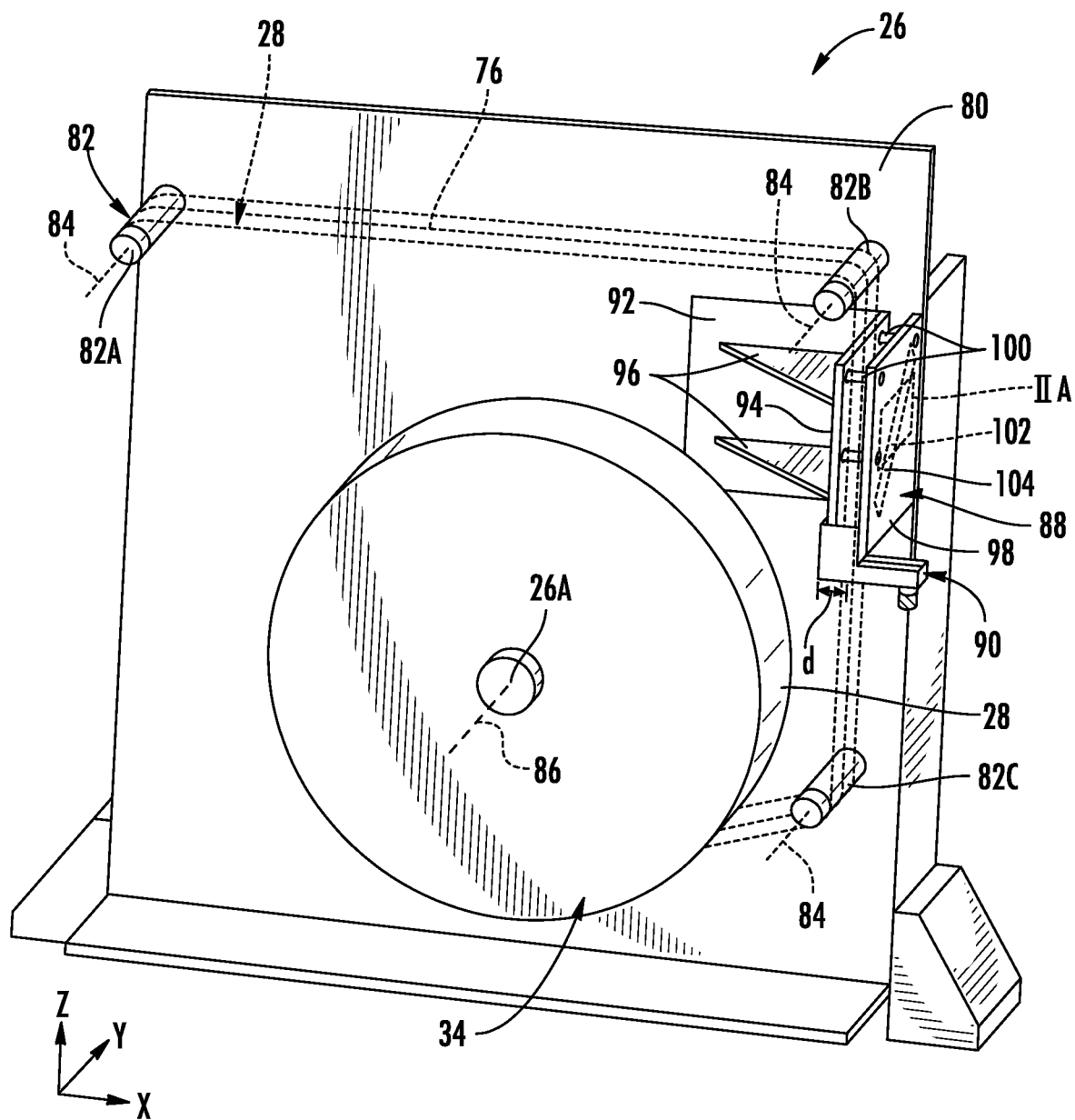
FIG. 2 is a front perspective view of a take-up module of the additive manufacturing apparatus having a reclamation system therein in accordance with various aspects of the present disclosure.
Figure 3:
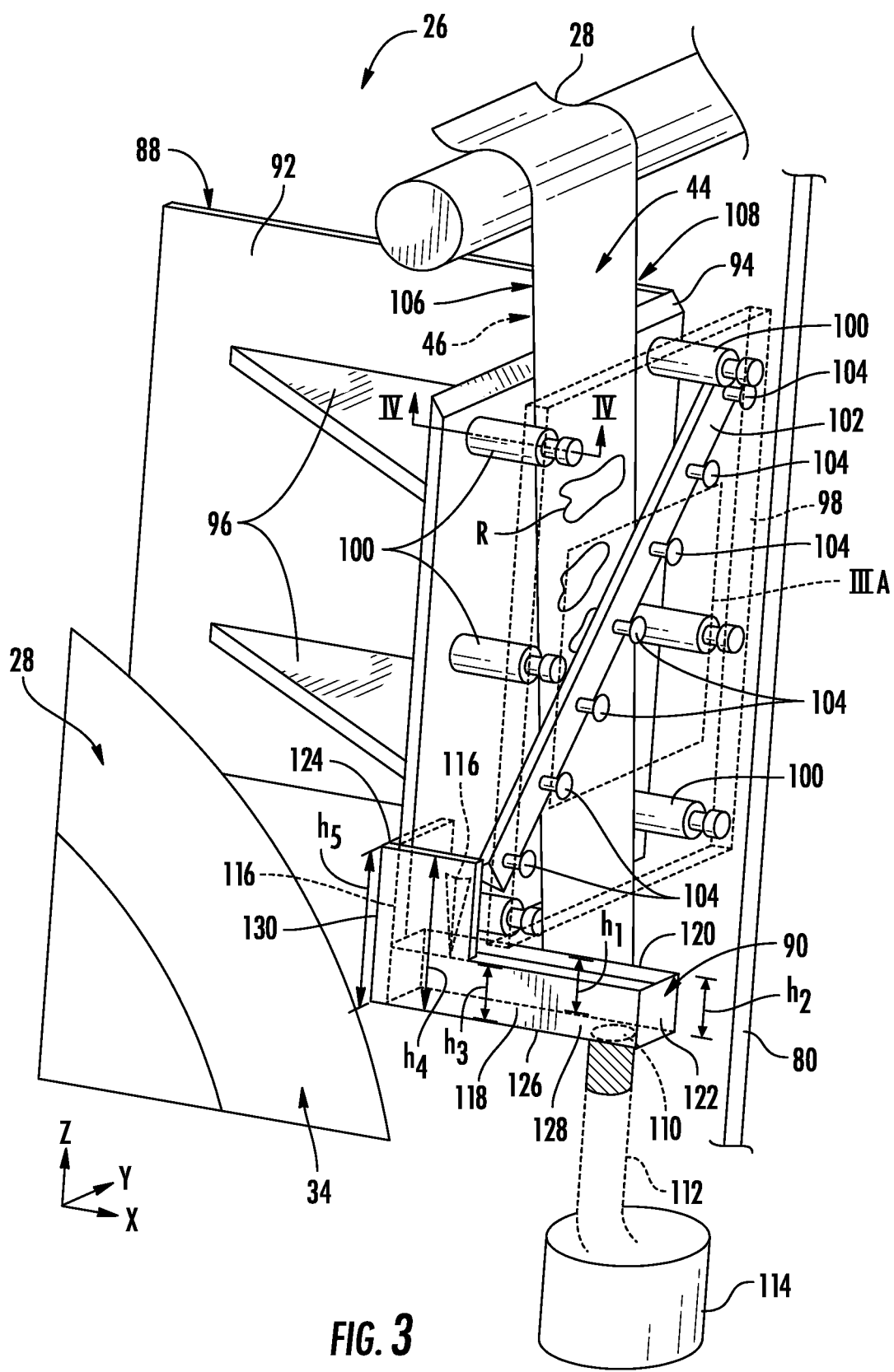
FIG. 3 is a front perspective view of the reclamation system in accordance with various aspects of the present disclosure.

Referring to FIGS. 2 and 3, exemplary perspective views of the take-up module 26 are illustrated in accordance with exemplary embodiments of the present disclosure. As illustrated, the take-up module 26 may include a take-up plate 80 that supports second mandrel 26A and may support the second portion 34 of the resin support 28. In various embodiments, one or more rollers 82 may also be anchored to the take-up plate 80. For example, a set of three rollers 82A, 82B, 82C may be positioned on various portions of the take-up plate 80. In some instances, each roller 82A, 82B, 82C may have an axis of rotation 84 that is generally parallel to an axis of rotation 86 of the second mandrel 26A. In operation, the resin support 28 may generally follow a resin support path illustrated by line 76. Accordingly, as the resin support 28 is translated, the resin support 28 may move along the first roller, then the second roller, the third roller, and towards a rolled portion of the resin support 28 that is wrapped about the second mandrel 26A.

The resin reclamation system 52 may be positioned anywhere along the resin support path downstream of at least one build zone 48 and may be configured to remove at least a portion of resin R that remains on the resin support 28 after the resin support 28 is removed from the build zone 48. In some examples, the reclamation system 52 may include a collection structure 88 that is configured to contact the resin support 28 and direct the resin R to a channel 90. For example, the collection structure 88 may include a base support 92 and a first plate 94 extending from the base support 92. In some instances the collection structure 88 may be integrally formed with and/or attached to the take-up plate 80 via fixed, pivoting, or floating connections. In some instances, the first plate 94 may be generally perpendicular to the base support 92. One or more braces 96 may extend between the first plate 94 and the base support 92. In some instances, the base support 92 and the first plate 94 may be integrally formed with one another or attached to one another through any practicable attachment fixture. Moreover, the braces 96 may be integrally formed with the first plate 94 and/or the base support 92 or later attached thereto. Moreover, the first plate 94 along with attached or integral braces 96 may be integrally formed with or anchored to the take-up plate 80.

A second plate 98 may be held in a separated manner from the first plate 94 by one or more standoffs 100. The standoffs 100 may be configured to maintain a predefined distance d between the first and second plates 94, 98 and may be positioned to accept the resin support 28 between the standoffs 100. In various examples, the standoffs 100 may be hard fixed spacers and/or compliant standoffs such as screws, springs, elastomeric material, and/or pneumatically or otherwise adjustable actuators. These actuators can be controlled via on board sensors detecting tension and/or pressure on the resin support to automatically adjust scraper contact.

In various examples, the collection structure 88 may include a scraper 102 that is configured to contact the resin support 28 and direct the resin R to the channel 90. In various examples, the scraper 102 may be capable of contacting the resin support 28 and/or the resin R provided on the resin support 28. In some instances, the resin support 28 is configured to be compressed between the scraper 102 and the first plate 94. Through contact with the resin support 28 and/or the resin R, the resin R may be separated from the resin support 28 and directed to the channel 90. In some instances, the scraper 102 may be configured as a wiper assembly, a blade assembly, and/or any other removal assembly, which may at least partially be formed from an elastomeric material, a polymeric material, a metallic material, a combination thereof, and/or any other material. In some instances, the scraper 102 may be configured to remove at least 40%, at least 50%, at least 60%, at least 70%, at least 80%, or at least 90% of the remaining resin R as the resin support 28 is between the first plate 94 and the second plate 98.

Figure 3A:
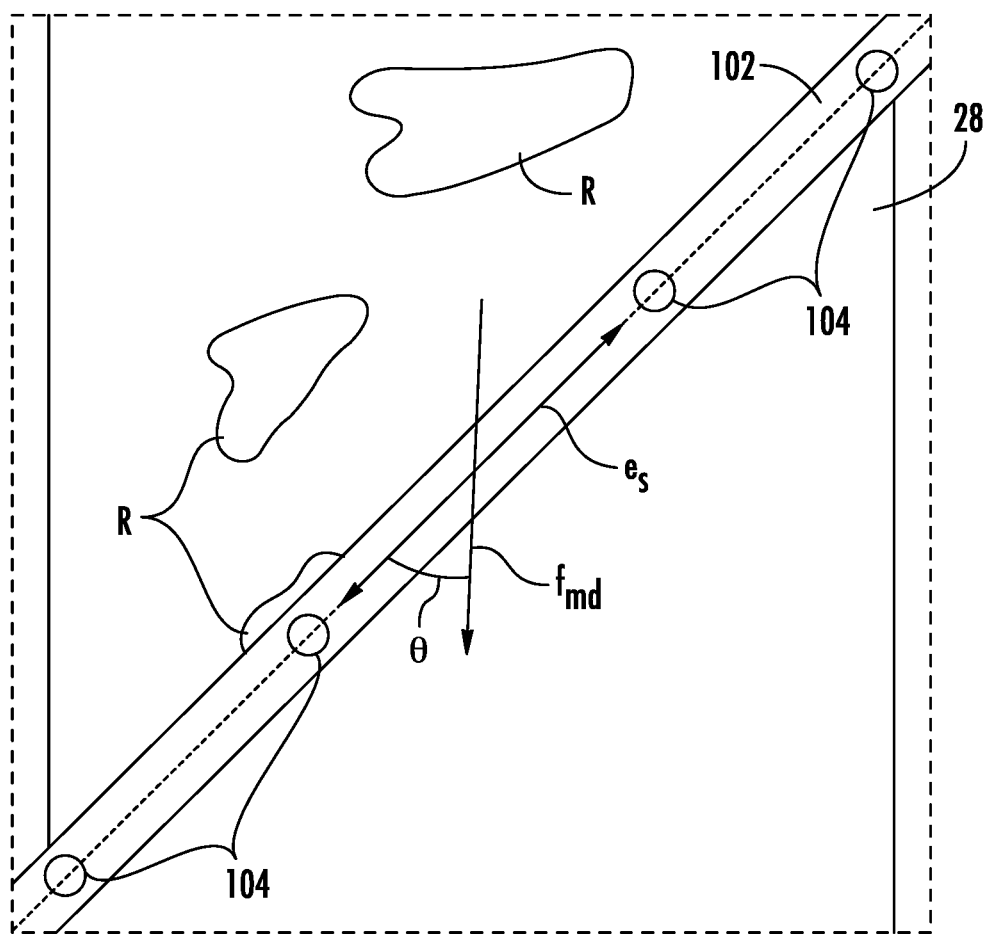
FIG. 3A is an enhanced view of area IIIA-IIIA of FIG. 3 in accordance with various aspects of the present disclosure.

As illustrated in FIGS. 3 and 3A, in various embodiments, the scraper 102 may be fixed to the second plate 98 through one or more fasteners 104 and/or be integral to the second plate 98. In addition, the one or more fasteners 104 may be configured to maintain the scraper 102 at an offset angle $\theta$ that is defined between a resin support movement direction $f_{md}$ and the elongation axis $e_s$ of the scraper 102. In some examples, the offset angle $\theta$ may be greater than 0 degrees and less than 90 degrees. For instance, the offset angle $\theta$ may be between 10 and 80 degrees, 20 and 70 degrees, 30 and 60 degrees, 40 and 50 degrees, 40 and 45 degrees, and/or any other practicable angle. In other instances, the scraper 102 may be a series of scrapers arranged in a linear, mirrored, and/or chevron pattern at any practicable angle to direct resin R to either side of the resin support into separate or one collection channel 90. As the resin R is separated from the resin support 28, the resin R may run along the scraper 102 to a position outward of the first edge portion 106 and/or the second edge portion 108 of the resin support 28 and towards the channel 90.

Referring back to FIGS. 2 and 3, in some instances, the first plate 94 may define a groove 116 (or any other structure) to route the resin R from a position proximate to an end portion of the scraper 102 to the channel 90. In some examples, the groove 116 may have a first width proximate to a top portion thereof and a second width proximate to the bottom portion or more proximate to the channel 90. In several examples, the second width may be less than the first width.

The channel 90 may include any structure that may maintain and/or direct the resin R to a specified location. For example, the channel 90 may maintain the resin R therein while directing the resin R from the channel 90 through a drain 110. A resin conduit 112 may be operably coupled with the drain 110 and direct the resin R to a reservoir 114. In some examples, the reservoir 114 may be positioned below the first plate 94 in the Z-axis direction. Further, the reservoir 114 may be separated from the first plate 94 in the Z-axis direction.

In various embodiments, the channel 90 may include a forward surface 118, a rearward surface 120, a first end surface 122, a second end surface 124, and a bottom surface 126. The rearward surface 120 may be positioned under a portion of at least one of the first and second plates 94, 98 in the Z-axis direction. The terms used herein to describe the various surfaces of the channel 90 are for reference to the illustrated embodiment. It will be appreciated that any of the surfaces described may be oriented in any manner without departing from the teachings provided herein.

The rearward surface 120 may have a first height $h_1$. The first end surface 122 may be positioned proximate to one end portion of the rearward surface 120 and may have a second height $h_2$. In various embodiments, the first end surface 122 may extend beyond the first plate 94 and/or the second plate 98 in the X-axis direction and below the first plate 94 and/or the second plate 98 in the Z-axis direction.

The forward surface 118 may include a first segment 128 at least partially on a first side of the scraper 102 in the X-axis direction and a second segment 130 at least partially on a second side of the scraper 102 in the X-axis direction. The first segment 128 may have a third height $h_3$. In some instances, the third height $h_3$ may be generally equal to the first height $h_1$ and/or the second height $h_2$. The second segment 130 may have a fourth height $h_4$ that may be greater than at least one of the first height $h_1$, the second height $h_2$, and/or the third height $h_3$. In some instances, the fourth height $h_4$ may extend from the bottom surface 126 to a position above at least a portion of the scraper 102 in the Z-axis direction.

The second end surface 124 may be positioned on an opposing side of the forward surface 118 and the rearward surface 120 from the first end surface 122. Moreover, the second end surface 124 may be positioned on an opposing side of the first plate 94 from the first end surface 122 in an X-axis direction. In various embodiments, the second end surface 124 may have a fifth height fourth height $h_5$ that may be generally equal to the fourth height fourth height $h_4$. The second surface may extend along at least a portion of the first plate 94 and/or be attached to the first plate 94. As such, the channel 90 may be supported on or integral to the first plate 94 and/or the second plate 98.

Figure 4A:
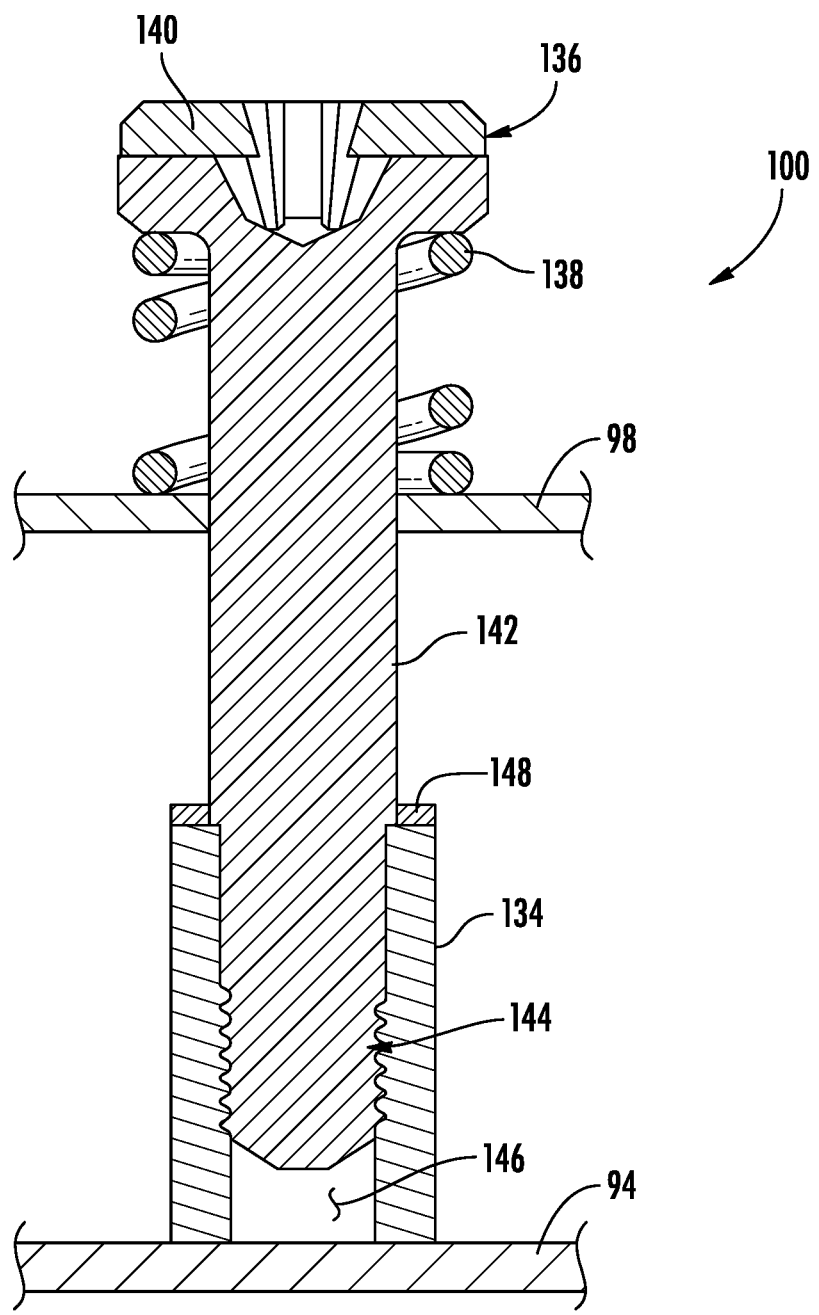
FIG. 4A is a cross-sectional view of a standoff of the reclamation system in accordance with various aspects of the present disclosure.
Figure 4B:
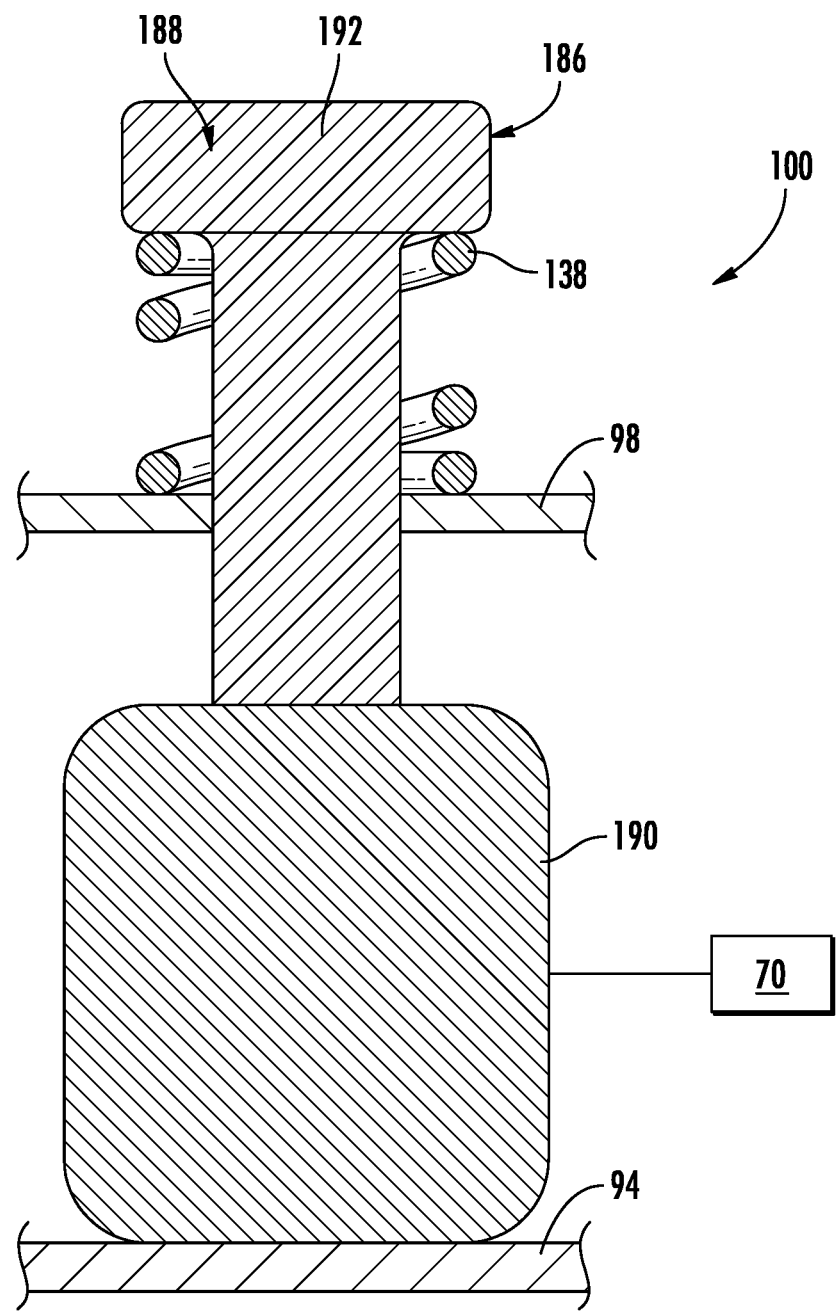
FIG. 4B is a cross-sectional view of a standoff of the reclamation system in accordance with various aspects of the present disclosure.

Referring to FIGS. 4A and 4B, various cross-sectional views of exemplary standoffs 100 are illustrated in accordance with exemplary embodiments of the present disclosure. For instance, as illustrated in FIG. 4A, the standoff 100 can include a boss 134, a fastener 136, and a spring 138. The fastener 136 can include a head 140 adapted to receive a driver, a shank 142 adapted to pass through the second plate 98, and a threaded portion 144 at the end of the shank 142 opposite the head 140. The threaded portion 144 of the fastener 136 is configured to secure the fastener 136 in a preformed aperture 146 formed the boss 134, which may be integrally formed with or attached to the first plate 94.

In some embodiments, the fastener 136 may be positioned repeatedly relative to the boss 134 by virtue of a collar 148 formed on the shank 142 of the fastener 136. The collar 148 limits the depth of penetration of the fastener 136 into the aperture. Alternatively, the threaded portion 144 of the fastener 136 can be fastened into a preformed, threaded aperture of the boss 134. By coming into contact with the threads of threaded aperture, the fastener 136 is being rotationally driven into the boss 134.

In some examples, the spring 138 may be positioned between the head 140 of the fastener 136 and the second plate 98. The spring 138 may be configured to absorb vibrations and/or allow for a minimal amount of movement of the second plate 98 relative to the first plate 94. By allowing for a small amount of movement, the scraper 102 may also move slightly relative to the first plate 94. The movement may also allow for a defined amount of tension to be placed on the resin support 28 by the scraper 102 based on the tension of the spring 138.

In the example illustrated in FIG. 4B, in various embodiments, the standoff 100 can include an actuator 186. The actuator 186 can be operably coupled with the first plate 94 and the second plate 98. Further, the actuator 186 may be configured to adjust and define a gap between the first plate 94 and the second plate 94.

In various examples, the actuator 186 can include a slide 188 movingly linked to a base 190. A control signal can be utilized to controllably connect the actuator 186 with the computing system 70. Accordingly, the gap can be adjusted by a control action such as movement of the slide 188 in response to signals from the computing system 70. In various embodiments, suitable control signals can be electrical, pneumatic, sonic, electromagnetic, a combination thereof, and/or any other type of signal.

In some examples, the spring 138 may be positioned between a head 192 of the slide 188 and the second plate 98. The spring 138 may be configured to absorb vibrations and/or allow for a minimal amount of movement of the second plate 98 relative to the first plate 94. By allowing for a small amount of movement, the scraper 102 may also move slightly relative to the first plate 94. The movement may also allow for a defined amount of tension to be placed on the resin support 28 by the scraper 102 based on the tension of the spring 138. It will be appreciated that the standoff 100 may be any other adjustable structure capable of adjusting and defining the gap between the first plate 94 and the second plate 98 without departing from the scope of the present disclosure.

Figure 5:
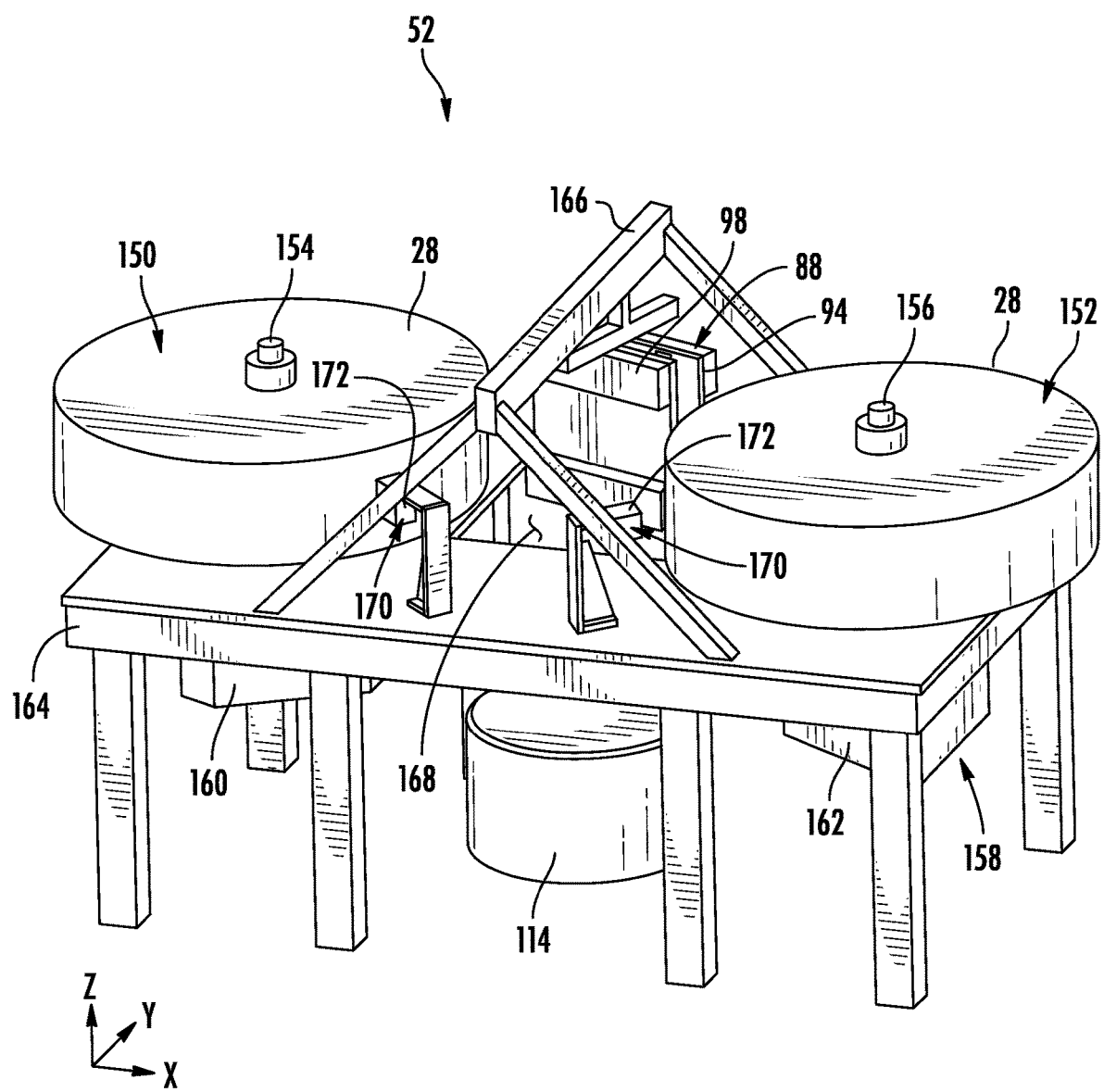
FIG. 5 is a front perspective view of a reclamation system in accordance with various aspects of the present disclosure.
Figure 6:
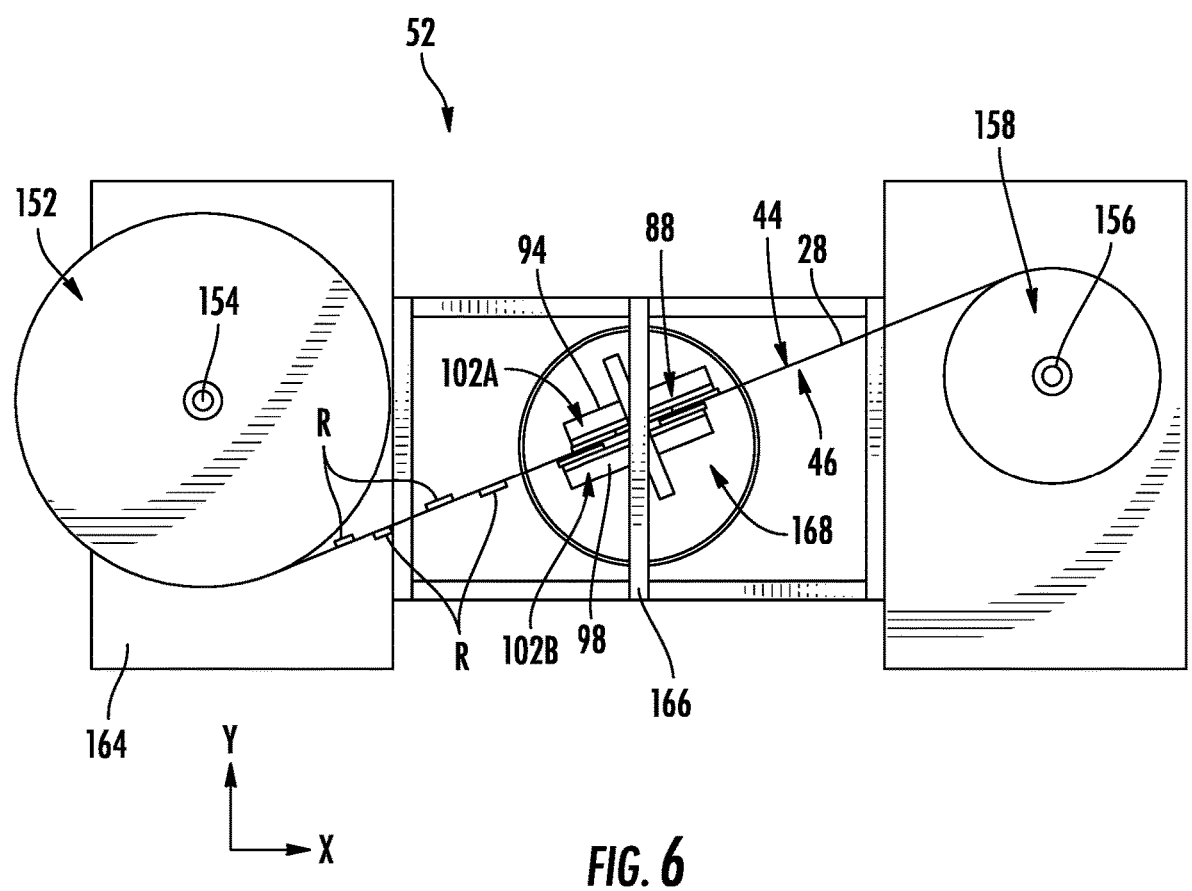
FIG. 6 is a top plan view of the reclamation system of FIG. 5 in accordance with various aspects of the present disclosure.
Figure 7:
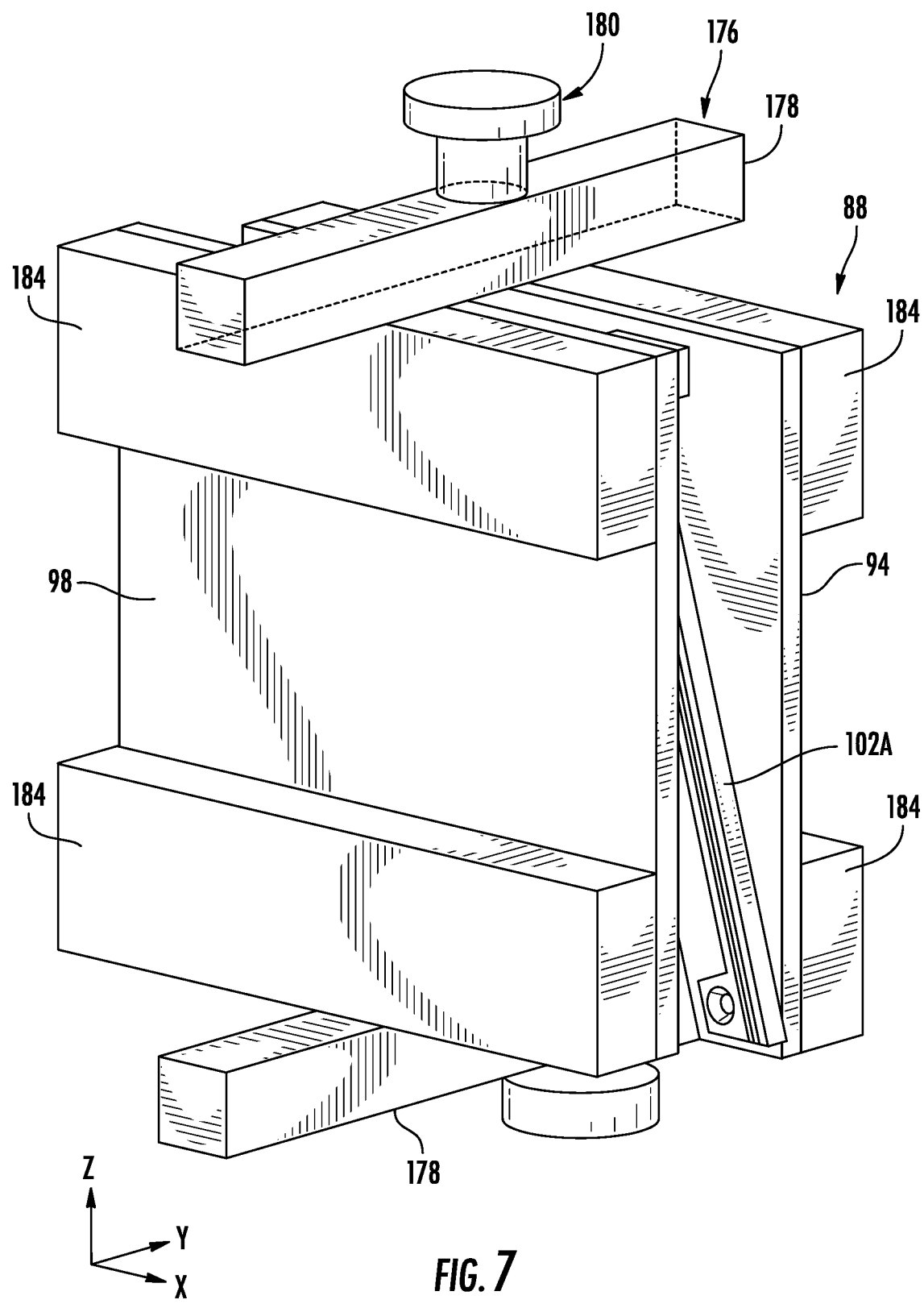
FIG. 7 is a front perspective view of a collection structure of the reclamation system in accordance with various aspects of the present disclosure.
Figure 8:
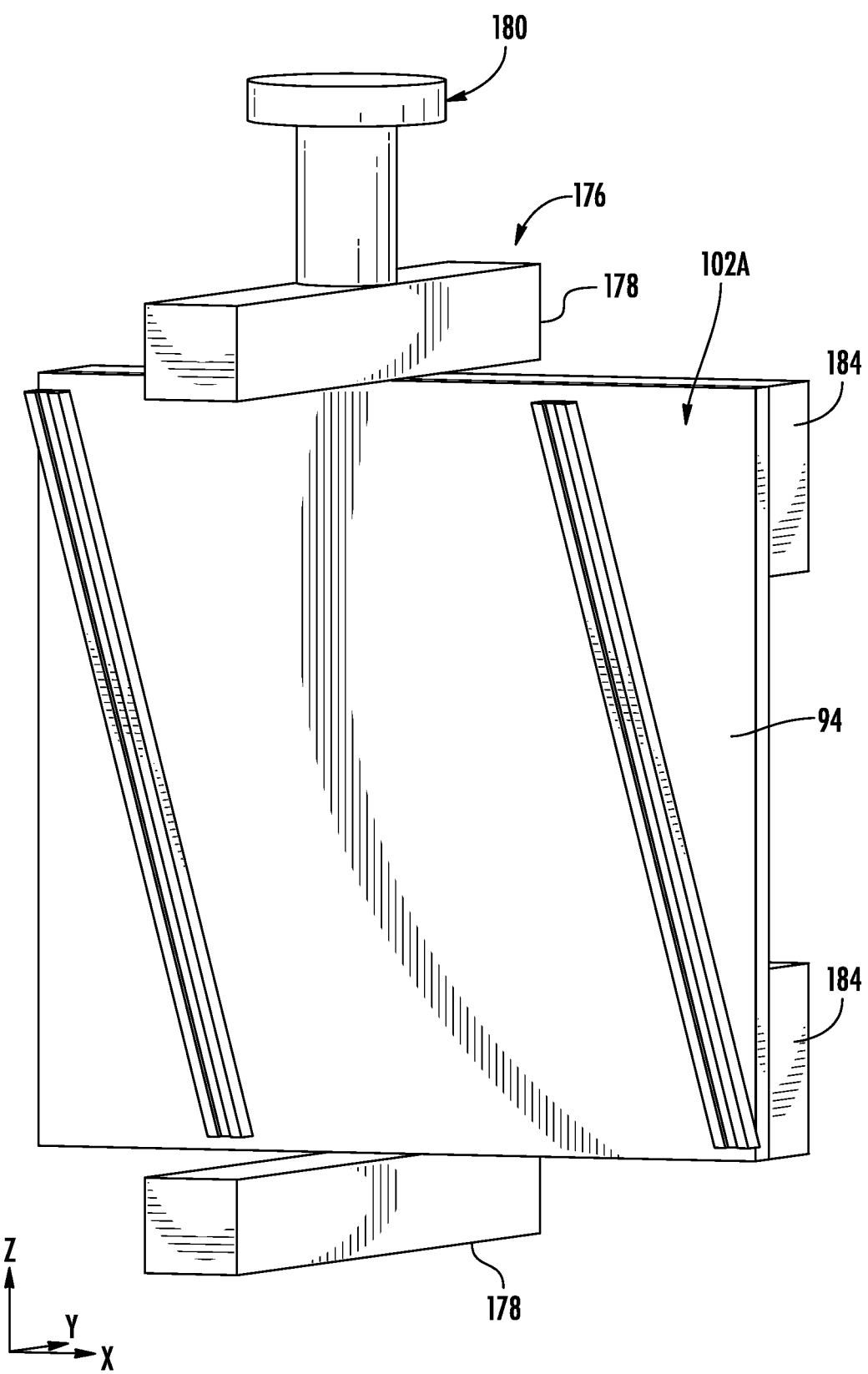
FIG. 8 is a front perspective view of a first plate of the collection structure in accordance with various aspects of the present disclosure.
Figure 9:
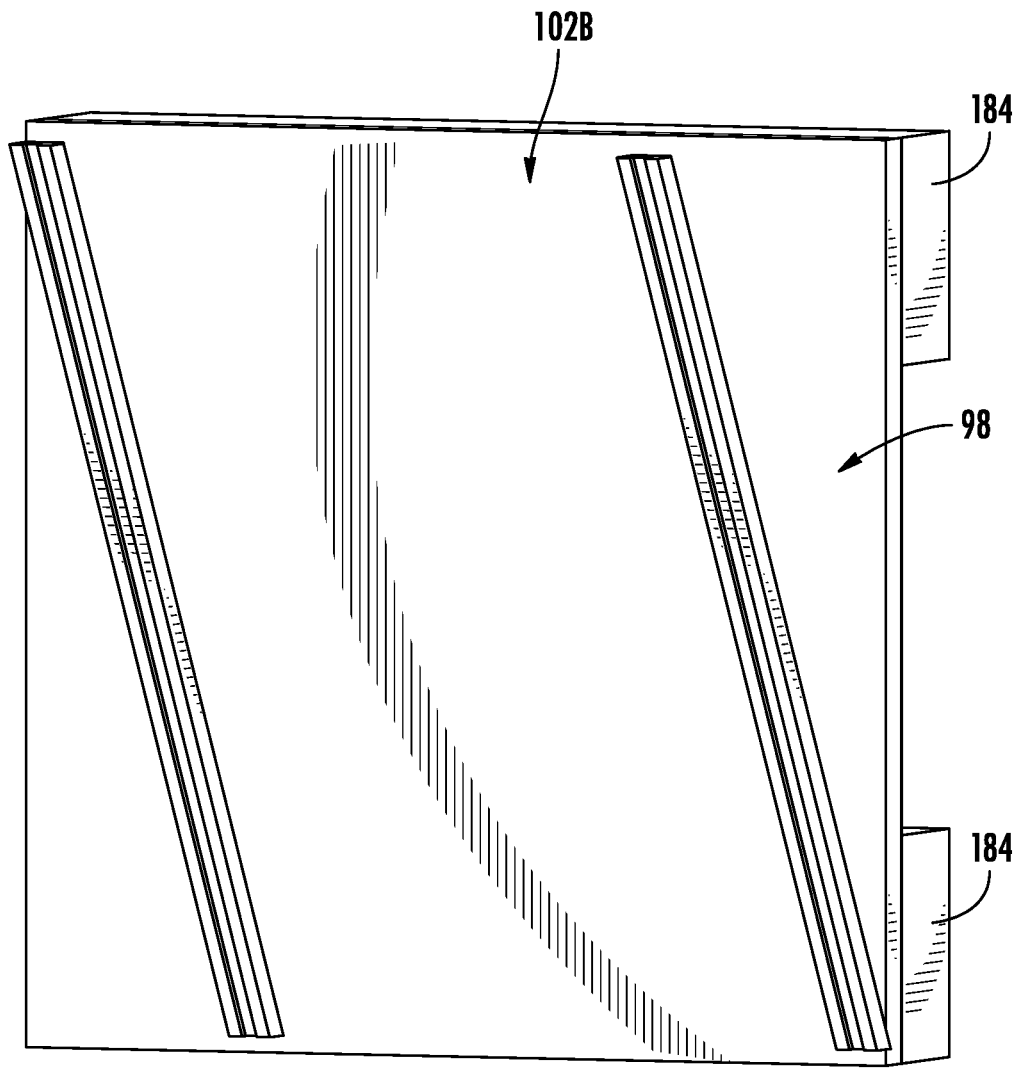
FIG. 9 is a rear perspective view of a second plate of the collection stricture in accordance with various aspects of the present disclosure.

Referring now to FIGS. 5 and 6, an exemplary perspective view and an exemplary top plan view of the remote reclamation system 52 are illustrated in accordance with various embodiments of the present disclosure. The remote reclamation system 52 may be used in conjunction with and/or in lieu of the inline reclamation system 52. In some examples, a first portion of the resin R may be separated from the resin support 28 by the inline reclamation system 52 and a second portion of the resin R may be separated from the resin support 28 by the remote reclamation system 52. In several embodiments, the resin support 28 may be translated through the first reclamation at a first translational speed, and the resin support 28 may be translated through the second reclamation system 52 at a second translational speed with the second translational speed being different from the first translational speed. The inline and/or the remote reclamation systems 52 provided herein may include any of the components described herein without departing from the teachings provided herein. By passing the resin support 28 through both a first reclamation system 52 (e.g., an inline reclamation system) and a second recommendation system 52 (e.g., a remote reclamation system), additional resin R may be removed from the resin support 28. In some instances, the second translational speed may be slower than the first translation speed to allow for harder to remove resin/slurry to be removed from the resin support 28 by the second reclamation system 52. Additionally or alternatively, the second reclamation system 52 may apply a varied amount of force from that applied by the first reclamation system 52. For example, the second reclamation system 52 may apply more force than the first reclamation system 52.

In some instances, the first reclamation system 52 may include a first type of scraper 102, which may be positioned at a first offset angle θ that is defined between a resin support movement direction $f_{md}$ and the elongation axis $e_s$ of the scraper 102. The second reclamation system 52 may include a second scraper 102 (that may have a different construction from the first scraper), which may be positioned at a second offset angle θ, to remove the residual resin R on the resin support 28 after the resin support 28 passes through the first reclamation system 52.

As illustrated in FIGS. 5 and 6, the second portion 34 (FIG. 3) of the resin support 28 may be wrapped about the second mandrel 26A to form a recovered segment 150 that may be transported to the remote reclamation system 52. In various embodiments, a first portion of the resin R originally deposited by the material depositor 50 may be cured to form a portion of the component 12, a second portion of the resin R may be removed by the first reclamation system 52, and a third portion of the resin R may remain on the resin support 28 thereby forming the recovered segment 150. Since the third portion of resin R may be rolled into the recovered segment, in some instances, the recovered segment 150 of resin support 28 may have resin R on both the first side 44 of the resin support 28 and the second side 46 of the resin support 28. The transportation may be accomplished with or without operator interaction. As the resin R was rolled with the resin support 28, the resin R may be attached to either the first side 44 of the resin support 28 and/or the second side 46 of the resin support 28. As such, in some examples, the collection structure 88 may include a first scraper 102A on a first plate 94 and a second scraper 102B on a second plate 98 with the resin support 28 positioned between the first and second scrapers 102A, 102B.

In some embodiments, the recovered segment 150 of the resin support 28 may be positioned on a first reclamation mandrel 154. The resin support 28 may be directed through the collection structure 88 and wrapped about a second reclamation mandrel 156. A cleaned segment 152 of the resin support 28 may be disposed about the second mandrel 156. As used herein, the "cleaned segment" of the resin support 28 is a portion of the resin support 28 that may have less resin R attached thereto than the recovered segment 150, which may occur by translating the resin support 28 through the collection structure 88.

The first mandrel 154 and/or the second mandrel 156 can be configured to control the resin support 28 translation speed and direction of the resin support 28 such that the desired tension and resin support translation speed is maintained in the resin support 28 through a drive assembly 158. By way of example and not limitation, the drive assembly 158 can be configured as one or more control devices 160, 162 associated with the first mandrel 154 and/or the second mandrel 156. Moreover, the control devices 160, 162 may include various components, such as motors, actuators, feedback sensors, and/or controls can be provided for driving the mandrels 154, 156 in such a manner so as to maintain the resin support 28 tensioned between the mandrels 154, 156 and to wind the resin support 28 from the first mandrel 154 to the second mandrel 156. Further, in various embodiments, the control devices 160, 162 may include a transmission in the form of a belt system, a gear system, and/or any other practicable system.

As illustrated, the recovered segment 150 and the cleaned segment 152 may be positioned on a support structure 164. A frame 166 can extend between the recovered segment 150 and the cleaned segment 152 of the resin support 28 and supports the collection structure 88. In some embodiments, the frame 166 may be supported by the support structure 164. The support structure 164 may further define an opening 168 therethrough which may be at least partially aligned with the collection structure 88 in the X-axis and/or the Y-axis directions. A reservoir 114 may be positioned on an opposite side of the opening 168 from the collection structure 88 that may be at least partially aligned with the collection structure 88 in the X-axis and/or the Y-axis directions. As the resin support 28 is translated from the first mandrel 154 to the second mandrel 156, the resin support 28 passes through the collection structure 88 thereby separating at least a portion of the resin R from the resin support 28. The resin R may then fall and/or be otherwise directed into the reservoir 114 positioned below the collection structure 88.

The reclamation system 52 may further include a sensor system 170 that may be able to detect one or more conditions of the reclamation system 52. For example, the sensor system 170 may include a sensor 172 for detecting a distance between the resin support 28 and the sensor 172. Based on the distance, the computing system 70 may compute the amount of the resin support 28 positioned about each of the mandrels. Additionally or alternatively, the sensor system 170 may include a sensor 172 for detecting the resin R on the resin support 28. In some instances, once the sensor 172 determines that a predefined length of resin support 28 has been translated from the recovered segment 150 to the cleaned segment 152, the drive assembly 158 may be reversed and the resin support 28 wrapped about the second mandrel 156 may be translated to a position about the first mandrel 154. As the resin support 28 is translated, the resin support 28 is again translated through the collection structure 88 to further remove resin R disposed on the resin support 28.

With reference to FIGS. 5-9, in various embodiments, the collection structure 88 can include a bracket 176 that can include one or more beams 178. For example, the first and second plates 94, 98 may each be operably coupled with a first beam 178 on a top portion thereof and a second beam 178 on a bottom portion thereof. The first beam 178 and/or the second beam 178 may be operably coupled with a pivot member 180. The pivot member 180 may slidably engage the frame 166 or any other structure.

In some embodiments, the first plate 94 and/or the second plate 98 may include a brace 184 fixed to an outer portion thereof. The brace 184 may be configured to prevent outward bending of the first plate 94 and/or the second plate 98.

With further reference to FIGS. 6-9, in various embodiments, the first scraper 102A may include a pair of removal assemblies that are spaced apart from one another. Likewise, the second scraper 102B may include a pair of removal assemblies that are spaced apart from one another. As provided herein, each removal assembly may be configured as a wiper assembly, a blade assembly, and/or any other removal assembly, which may at least partially be formed from an elastomeric material, a polymeric material, a metallic material, a combination thereof, and/or any other material.

Now that the construction and configuration of the additive manufacturing apparatus having one or more accumulators have been described according to various examples of the present subject matter, various method 200 for operating an additive manufacturing apparatus are provided. The method 200 can be used to operate the additive manufacturing apparatus and the one or more reclamation systems (e.g., an inline reclamation system and/or a remote reclamation system), or any other suitable additive manufacturing apparatus having any type and configuration of positioning assembly. It should be appreciated that the example method 200 is discussed herein only to describe example aspects of the present subject matter and is not intended to be limiting.

Figure 10:
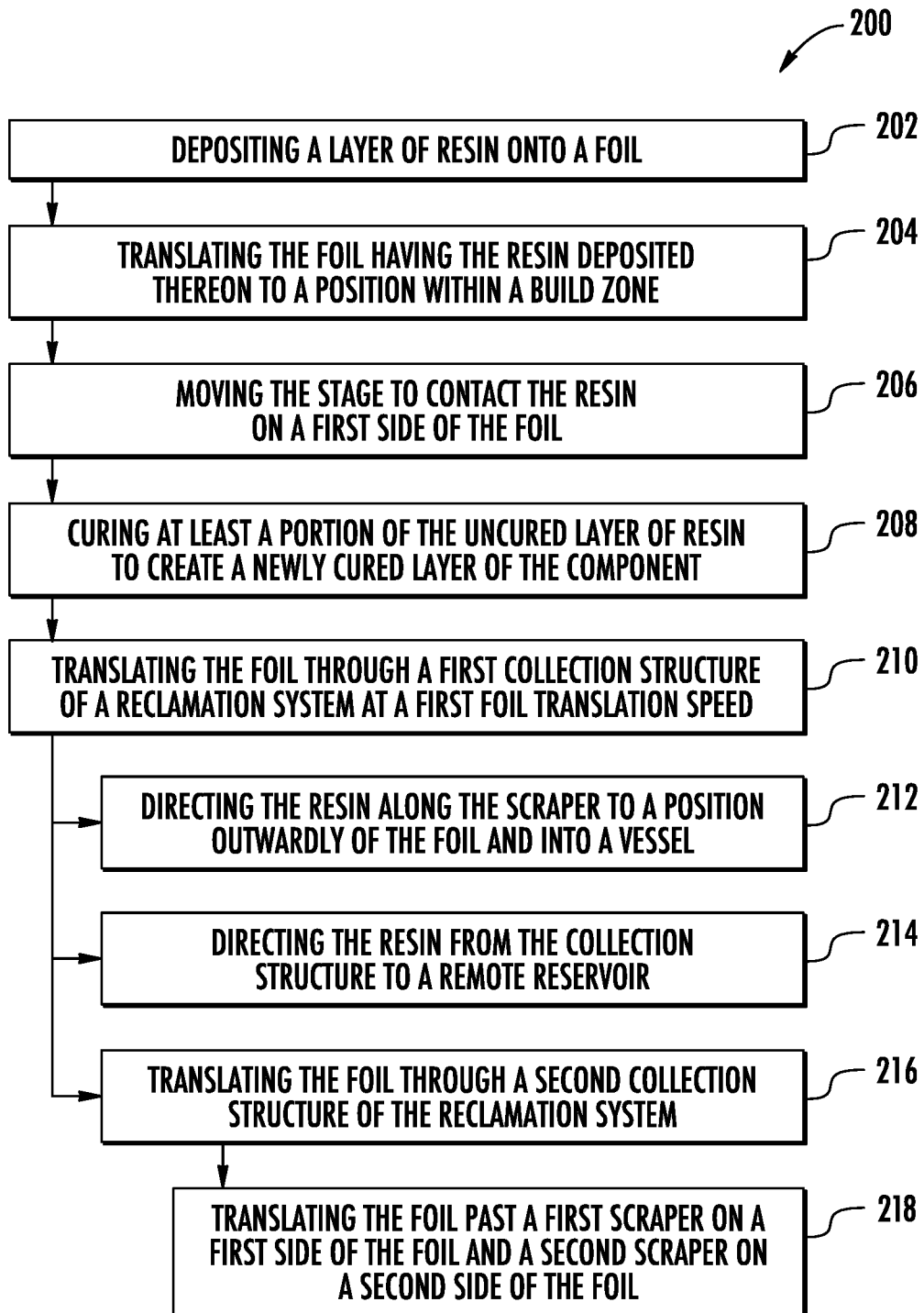
FIG. 10 is a method of operating the manufacturing apparatus in accordance with various aspects of the present disclosure.

Referring now to FIG. 10, the method 200 may include, at step 202, depositing a layer of resin onto a resin support. As provided herein, a material depositor may be positioned along the resin support and is operable to apply a layer of resin R over the resin support. At step 204, the method includes translating the resin support having the resin deposited thereon to a position within a build zone.

At step 206, the method can include moving the stage to contact the resin on a first side of the resin support, and, at step 208, the method includes curing at least a portion of the uncured layer of resin to create a newly cured layer of the component through the use of a radiant energy device.

At step 210, the method can include translating the resin support through a first collection structure of a reclamation system at a first resin support translation speed measured by a resin support translation speed as the resin support passes the scraper. The collection structure may support one or more scrapers that may be configured to remove at least a first portion of the resin that remains on the resin support after the resin support has been translated out of the build zone. In various embodiments, an offset angle θ defined between an elongation axis of the scraper and the movement direction of the resin support may be greater than 0 degrees and less than or equal to 90 degrees.

In various embodiments, the scraper may include first and second plates that are separated by an initial distance that is defined by a standoff. In various embodiments, the resin support can be translated between at least first and second standoffs.

In some instances, the standoff may include a boss, a fastener, and a spring positioned about a portion of the fastener and/or an actuator. As the resin support is translated through the collection structure of the reclamation system, the distance between the first plate and the second plate may be varied with the spring providing a predefined amount of resistance for returning the second plate to the initial distance from the first plate.

Once removed by the scraper, at step 212, the method includes directing the resin along the scraper to a position outwardly of the resin support and into a channel. The channel may define a drain. At step 214, the method includes directing the resin from the collection structure to a remote reservoir, which may be accomplished through gravity assistance. The remote reservoir is separated from the channel and may be fluidly coupled with the reservoir through a resin conduit. From the reservoir, the resin may be refreshed for reuse and/or recertification and returned to a material depositor. Additionally or alternatively, the resin retained within the reservoir may be removed from the apparatus as waste.

In some instances, the method, at step 216, can include translating the resin support through a second collection structure of the reclamation system at a second resin support translation speed measured by a resin support translation speed as the resin support passes the first scraper and/or the second scraper. In various embodiments, the first resin support translation speed may be less than or greater than the first resin support translation speed. Alternatively, the first resin support translation speed may be generally equal to the second resin support translation speed.

The second reclamation system may be remote such that the resin support is removed from a second mandrel within a take-up module and transferred to a mandrel of the remote reclamation system. In various examples, translating the resin support through a second collection structure of the reclamation system can further include translating the resin support past a first scraper on a first side of the resin support and a second scraper on a second side of the resin support at step 218.

Figure 11:
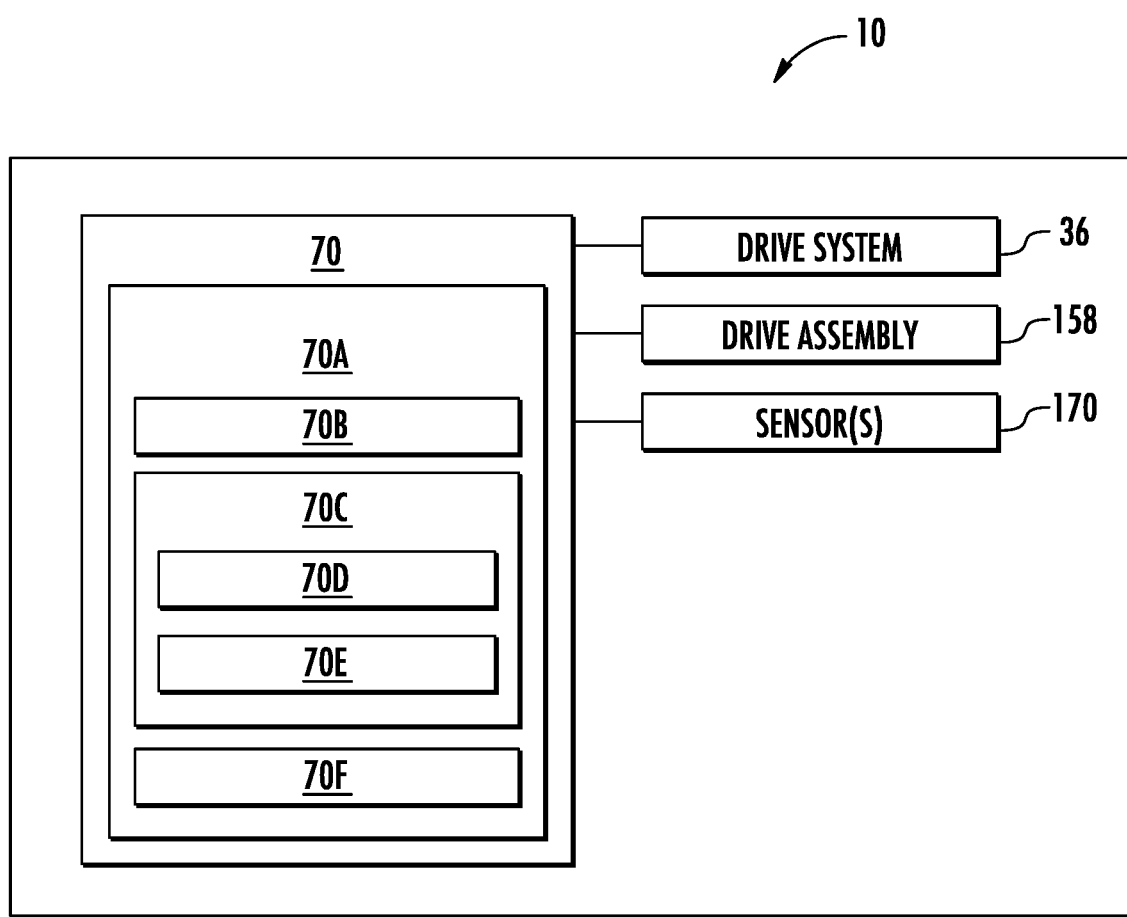
FIG. 11 depicts an exemplary computing system for an additive manufacturing apparatus in accordance with various aspects of the present disclosure.

FIG. 11 depicts certain components of the computing system 70 according to example embodiments of the present disclosure. The computing system 70 can include one or more computing device(s) 70A which may be used to implement the method 200 such as described herein. The computing device(s) 70A can include one or more processor(s) 70B and one or more memory device(s) 70C. The one or more processor(s) 70B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 70C can include one or more non-transitory computer-readable storage medium(s), such as RAM, ROM, EEPROM, EPROM, flash memory devices, magnetic disks, etc., and/or combinations thereof.

The memory device(s) 70C can include one or more computer-readable media and can store information accessible by the one or more processor(s) 70B, including instructions 70D that can be executed by the one or more processor(s) 70B. The instructions 70D may include one or more steps of the method 200 described above, such as to execute operations of the additive manufacturing apparatus 10 described above. For instance, the memory device(s) 70C can store instructions 70D for running one or more software applications, displaying a user interface, receiving user input, processing user input, etc. In some implementations, the instructions 70D can be executed by the one or more processor(s) 70B to cause the one or more processor(s) 70B to perform operations, e.g., such as one or more portions of the method described herein. The instructions 70D can be software written in any suitable programming language or can be implemented in hardware. Additionally, and/or alternatively, the instructions 70D can be executed in logically and/or virtually separate threads on processor(s) 70B.

The one or more memory device(s) 70C can also store data 70E that can be retrieved, manipulated, created, or stored by the one or more processor(s) 70B. The data 70E can include, for instance, data to facilitate performance of the method 200 described herein. The data 70E can be stored in one or more database(s). The one or more database(s) can be connected to computing system 70 by a high bandwidth LAN or WAN, or can also be connected to the computing system 70 through network(s) (not shown). The one or more database(s) can be split up so that they are located in multiple locales. In some implementations, the data 70E can be received from another device.

The computing device(s) 70A can also include a communication module or interface 70F used to communicate with one or more other component(s) of computing system 70 or the additive manufacturing apparatus 10 over the network(s). The communication interface 70F can include any suitable components for interfacing with one or more network(s), including, for example, transmitters, receivers, ports, controllers, antennas, or other suitable components.

As provided herein, the computing system 70 may be operably coupled with one or more of the drive system 36, the sensor system 170, and/or the drive assembly. The computing system 70 may be configured to control the actuation of the drive system 36 based on the information from one or more sensors 172 of the sensor system 170.

Likewise, the computing system 70 may be configured to control the actuation of the drive assembly 158 based on the information from one or more sensors 172 of the sensor system 170.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt-based superalloys (e.g., those available under the name Inconel® available from Special Metals Corporation). These materials are examples of materials suitable for use in the additive manufacturing processes described herein, and may be generally referred to as "additive materials."

Further aspects are provided by the subject matter of the following clauses:

A reclamation system for use with an additive manufacturing apparatus, the additive manufacturing apparatus including a stage configured to support one or more cured layers of resin that form a component, a radiant energy device operable to generate and project radiant energy in a patterned image, and an actuator configured to change a relative position of the stage relative to the radiant energy device, the system comprising: a first collection structure configured to accept a resin support therethrough along a resin support movement direction; and a first scraper positioned within the first collection structure, wherein the first scraper has an elongation axis that is offset from the resin support movement direction by an offset angle, and wherein the offset angle is less than 90 degrees.

The reclamation system of one or more of these clauses, wherein the first collection structure further comprises a first plate and a second plate separated from the first plate, and wherein the resin support is translated between the first plate and the second plate.

The reclamation system of one or more of these clauses, further comprising: a channel fluidly coupled with the first scraper, the channel at least partially supported by the first plate.

The reclamation system of one or more of these clauses, further comprising: a drain defined by the channel and configured to direct the resin from the channel to a reservoir.

The reclamation system of one or more of these clauses, wherein the first scraper is attached to the second plate and extends towards the first plate.

The reclamation system of one or more of these clauses, further comprising: an actuator operably coupled with the first plate and the second plate, the actuator configured to adjust and define a gap between the first plate and the second plate.

The reclamation system of one or more of these clauses, wherein the first scraper extends outwardly of at least one edge portion of the resin support and wherein a forward surface of the channel extends upwardly of a portion of the first scraper in a Z-axis direction.

The reclamation system of one or more of these clauses, wherein the reclamation system includes a first plate that defines a groove proximate to an end portion of the first scraper and configured to route the resin from the first scraper to the channel.

The reclamation system of one or more of these clauses, wherein the first scraper is attached to a first plate and a second scraper is attached to a second plate, the first plate separated from the second plate and configured to accept the resin support between the first scraper and the second scraper.

The reclamation system of one or more of these clauses, further comprising: a bracket supporting each of a first plate and a second plate, wherein the first scraper is attached to the first plate and a second scraper is attached to the second plate, the bracket including a pivot member that is configured to rotate the first plate and the second plate relative to a mandrel.

The reclamation system of one or more of these clauses, wherein the reclamation system includes a first reclamation system supporting the first scraper and a second collection structure supporting a second scraper, and wherein the resin support translates past the first scraper at a first resin support translation speed and the resin support translates past the second scraper at a second resin support translation speed, the second resin support translation speed different than the first resin support translation speed.

A method of operating a reclamation system for use with an additive manufacturing apparatus, the additive manufacturing apparatus configured to cure a first portion of a resin to create a layer of a component, the method comprising: translating a resin support between a first plate and a second plate of a first collection structure at a first resin support translation speed; and removing a second portion of the resin from the resin support with a first scraper attached to the second plate as the resin support is translated between the first plate and the second plates.

The method of one or more of these clauses, further comprising: translating the resin support through a second collection structure at a second resin support translation speed, the second speed different than the first speed.

The method of one or more of these clauses, wherein the second collection structure includes a second scraper attached to the first plate, and wherein the first scraper and the second scraper are positioned on opposing sides of the resin support.

The method of one or more of these clauses, wherein the resin support is wound about a feed mandrel and a take-up mandrel when translated through the first collection structure and the resin support is wound about a first reclamation mandrel and a second reclamation mandrel when translated through the second collection structure.

The method of one or more of these clauses, wherein the first collection structure is configured to contact the resin support and direct the resin to a channel, and wherein the channel defines a drain that directs the resin from the channel to a reservoir.

A reclamation system for use with an additive manufacturing apparatus that includes a stage configured to support a component and a radiant energy device positioned opposite to the stage such that it is operable to generate and project radiant energy in a patterned image, the system comprising: a first plate; a second plate separated from the first plate; and a scraper attached to the second plate, wherein a resin support is configured to be compressed between the scraper and the first plate.

The reclamation system of one or more of these clauses, wherein the scraper has an elongation axis that is offset from a resin support movement direction of the resin support through the reclamation system by an offset angle, and wherein the offset angle is less than 90 degrees.

The reclamation system of one or more of these clauses, wherein the offset angle is between 40 and 50 degrees.

The reclamation system of one or more of these clauses, further comprising: a reservoir positioned below the first plate in a Z-axis direction, the reservoir separated from the first plate in the Z-axis direction.

This written description uses examples to disclose the concepts presented herein, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for an additive manufacturing apparatus, the additive manufacturing apparatus including a stage configured to support one or more cured layers of resin that form a component from a first portion of the resin positioned on a resin support, a radiant energy device operable to generate and project radiant energy in a patterned image, and an actuator configured to change a relative position of the stage relative to the radiant energy device, the system comprising:
   a first reclamation system configured to remove a second portion of the resin from the resin support;
   a second reclamation system downstream of the first reclamation system, the second reclamation system configured to remove a third portion of the resin from the resin support,
   wherein the resin support is translated through the first reclamation system at a first translational speed and through the second reclamation system at a second translational speed, and wherein the second translational speed is different from the first translational speed.

2. The system of claim 1, wherein the second reclamation system is configured to apply a varied amount of force from that applied by the first reclamation system.

3. The system of claim 1, wherein the first reclamation system includes a first scraper and the second reclamation system includes a second scraper, the second scraper having a different construction from the first scraper.

4. The system of claim 3, wherein the first scraper is positioned at a first offset angle that is defined between a resin support movement direction and an elongation axis of the first scraper.

5. The system of claim 3, the first scraper is positioned at a first offset angle that is defined between a resin support movement direction and an elongation axis of the first scraper.

6. The system of claim 1, wherein the first reclamation system further comprises:
   a first collection structure configured to accept the second portion of the resin; and
   a first scraper positioned within the first collection structure.

7. The system of claim 6, wherein the second reclamation system further comprises:
   a second collection structure configured to accept the third portion of the resin;
   a second scraper positioned on a first plate within the second collection structure; and
   a third scraper on a second plate within the second collection structure, the third scraper configured to be positioned on an opposing side of the resin support from the second scraper.

8. The system of claim 1, wherein the second reclamation system further comprises:
   a first reclamation mandrel configured to retain a first portion of the resin support;
   a second reclamation mandrel configured to retain a second portion of the resin support; and
   a drive assembly configured to translate the resin support from the first reclamation mandrel to the second reclamation mandrel, wherein the drive assembly is configured to control a resin support translation speed and direction.

9. The system of claim 8, wherein the second reclamation system further comprises:
   a second collection structure configured to accept the third portion of the resin;
   one or more scrapers operably coupled with a first plate within the second collection structure and a second plate within the second collection structure; and
   a frame configured to support at least a portion of the second collection structure.

10. The system of claim 9, wherein the second reclamation system further comprises:
    a pivot member operably coupled with the frame, the pivot member configured to alter an angle of the first plate and the second plate relative to the frame.

11. The system of claim 10, wherein the pivot member is further configured to slide along at least a portion of the frame.

12. A method of operating a reclamation system for use with an additive manufacturing apparatus, the additive manufacturing apparatus configured to cure a first portion of a resin to create a layer of a component, the method comprising:
    translating a resin support through a first reclamation system at a first translational speed to remove a second portion of the resin from the resin support;
    translating the resin support through a second reclamation system downstream of the first reclamation system at a second translational speed to remove a third portion of the resin from the resin support,
    wherein the second translational speed is different from the first translational speed.

13. The method of claim 12, further comprising:
    applying a first amount of force to the resin support in the first reclamation system; and
    applying a second amount of force to the resin in the second reclamation system,
    wherein the first amount of force is varied from the second amount.

14. The method of claim 12, wherein the second collection structure includes a second scraper attached to the first plate, and wherein the first scraper and the second scraper are positioned on opposing sides of the resin support.

15. The method of claim 14, further comprising:
pivoting the second collection structure as the resin support passes through the second reclamation system.

16. A reclamation system for use with an additive manufacturing apparatus that includes a stage configured to support a component and a radiant energy device positioned opposite to the stage such that it is operable to generate and project radiant energy in a patterned image to cure resin supported on a resin support, the system comprising:
a first collection structure comprising a scraper positioned on a plate; and
a second collection structure comprising a first scraper on a first plate, the first scraper configured to be positioned on an opposing side of the resin support from the scraper.

17. The reclamation system of claim 16, further comprising:
a first reclamation mandrel configured to retain a first portion of the resin support;
a second reclamation mandrel configured to retain a second portion of the resin support; and
a drive assembly configured to translate the resin support from the first reclamation mandrel to the second reclamation mandrel, wherein the drive assembly is configured to control a resin support translation speed and a direction.

18. The reclamation system of claim 17, wherein the second collection structure comprises:
a second scraper operably coupled with a second plate; and
a frame operatively supporting at least a portion of the first plate and the second plate.

19. The reclamation system of claim 18, wherein the second collection structure further comprises:
a pivot member operably coupled with the frame, the pivot member configured to alter an angle of the first plate and the second plate relative to the frame.

20. The reclamation system of claim 19, wherein the pivot member is further configured to slide along at least a portion of the frame.

* * * * *